US011232553B2

(12) United States Patent
Parikh et al.

(10) Patent No.: US 11,232,553 B2
(45) Date of Patent: Jan. 25, 2022

(54) SYSTEM, METHOD AND COMPUTER PROGRAM PRODUCT FOR SECURITY ANALYSIS OF JEWELRY ITEMS

(71) Applicant: Parikh Holdings LLC, Scarsdale, NY (US)

(72) Inventors: Aniket Parikh, Scarsdale, NY (US); Archana Parikh, Scarsdale, NY (US)

(73) Assignee: Parikh Holdings LLC, Scarsdale, NY (US)

( * ) Notice: Subject to any disclaimer, the term of this patent is extended or adjusted under 35 U.S.C. 154(b) by 0 days.

(21) Appl. No.: 17/062,114

(22) Filed: Oct. 2, 2020

(65) Prior Publication Data

US 2021/0027447 A1    Jan. 28, 2021

Related U.S. Application Data

(63) Continuation-in-part of application No. 16/455,195, filed on Jun. 27, 2019, now Pat. No. 10,825,166, (Continued)

(51) Int. Cl.
*G06T 7/00* (2017.01)
*G06K 9/62* (2006.01)
(Continued)

(52) U.S. Cl.
CPC .............. *G06T 7/001* (2013.01); *G06K 9/52* (2013.01); *G06K 9/6203* (2013.01); (Continued)

(58) Field of Classification Search
CPC ........ G01N 21/87; G06K 9/52; G06K 9/6203; G06K 9/6215; G06K 9/00671;
(Continued)

(56) References Cited

U.S. PATENT DOCUMENTS 6,980,283 B1 *  12/2005  Aggarwal .............. G01N 21/87
                                                356/30
10,380,734 B2 *  8/2019  Parikh ................ G06Q 30/0283
(Continued)

OTHER PUBLICATIONS

European Patent Search Report dated Dec. 3, 2020, corresponding to European Patent Application No. 18758281.2; 10 pages.

*Primary Examiner* — Farzana Hossain

(57) ABSTRACT

Method, system and computer program product for verification of jewelry items through evaluation of one or more images of a gemstone captured at one or more points in time. The captured images show at least the gemstone girdle. The images are analyzed to identify unique gemstone girdle physical characteristics and one or more diagrams and codes representing the unique combination of gemstone physical characteristics are generated. The gemstone images, diagrams and associated identification information can be stored by the system in a database record using block-chain techniques. Subsequently captured query images can be analyzed and compared to identify/authenticate a gemstone, detect any change in the gemstone. The system is also configured to update the database record with each gemstone verification and maintain a secure block-chain based record of all detected gemstone changes, verifications and related transactions. The system further enables various enhanced security methods and retail applications through a commerce platform.

23 Claims, 18 Drawing Sheets

Related U.S. Application Data which is a continuation of application No. 15/442,797, filed on Feb. 27, 2017, now Pat. No. 10,380,734.

(51) Int. Cl.
  *G06T 7/73* (2017.01)
  *G06Q 30/02* (2012.01)
  *G06Q 30/06* (2012.01)
  *G06K 9/52* (2006.01)

(52) U.S. Cl.
  CPC ....... *G06K 9/6215* (2013.01); *G06Q 30/0283* (2013.01); *G06Q 30/0629* (2013.01); *G06T 7/0002* (2013.01); *G06T 7/74* (2017.01); *G06T 2207/30108* (2013.01)

(58) Field of Classification Search
  CPC .. G06K 9/4604; G06K 9/6201; G06K 9/6272; G06Q 30/0283; G06Q 30/0629; G06T 2207/30108; G06T 7/0002; G06T 7/001; G06T 7/62; G06T 7/74
  See application file for complete search history.

(56) References Cited

U.S. PATENT DOCUMENTS

| | | | |
|---|---|---|---|
| 10,825,166 B2 * | 11/2020 | Parikh | G06Q 30/0283 |
| 2005/0011226 A1 * | 1/2005 | So | A44C 17/001 |
| | | | 63/32 |
| 2005/0246239 A1 * | 11/2005 | Yeko, Sr. | G06Q 30/0625 |
| | | | 705/26.41 |
| 2010/0121769 A1 | 5/2010 | Yeko, Sr. | |
| 2010/0250201 A1 * | 9/2010 | Sivovolenko | G06T 17/10 |
| | | | 703/1 |
| 2014/0052563 A1 * | 2/2014 | Watkins | G06Q 30/0621 |
| | | | 705/26.5 |
| 2014/0139608 A1 * | 5/2014 | Rosario | B23K 26/359 |
| | | | 347/225 |
| 2016/0004926 A1 * | 1/2016 | Kerner | G06T 7/60 |
| | | | 348/46 |
| 2016/0232432 A1 | 8/2016 | Regev | |
| 2017/0241913 A1 * | 8/2017 | Gu | G01N 21/87 |
| 2020/0074478 A1 * | 3/2020 | Peters | G06Q 10/0831 |
| 2021/0142462 A1 * | 5/2021 | Parikh | G06T 7/90 |
| 2021/0201461 A1 * | 7/2021 | Parikh | G06K 9/52 |

\* cited by examiner

August 03, 2016

Report type................................. Grading Report
GIA Report Number ........................... 5172771044
Shape and Cutting Style..................... Round Brilliant
Measurements ....................... 6.36 - 6.39 x 4.13 mm Carat Weight ................................... 1.07 carat
Color Grade ............................... Very Light Gray
Color Origin....................................... Natural
Color Distribution ......................... Not Applicable
Clarity Grade ......................................... SI2
Proportions

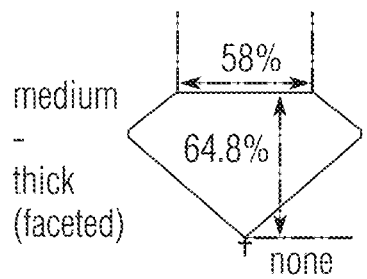

Profile not to actual proportions

Polish........................................ Very Good
Symmetry...................................... Excellent
Fluorescence ...................................... None
Comments: Additional clouds, pinpoints and surface graining are not shown.

SYSTEM, METHOD AND COMPUTER PROGRAM PRODUCT FOR SECURITY ANALYSIS OF JEWELRY ITEMS

FIELD OF THE INVENTION

The invention relates to security aspect of jewelry items, and in particular to security analysis of jewelry items through image comparison.

BACKGROUND OF THE INVENTION

High-valued articles like jewelry and diamond are susceptible for steal and fraud. These items can be protected from steal through safety measures, however, fraud prevention is a complex task as the quality and value of such items can only be determined by trained experts. Even a small difference in the quality of precious metals or diamonds can create a big difference in its value. For example, many gemstones can appear to have the same cut, color, shape and size. So, when a gemstone is given to a jeweler for repair or assessment, there is a chance that it can be swapped with a lower value gemstone having same appearance without the knowledge of customer.

Various measures have been developed to detect the purity and originality of these precious articles and to estimate its real value. Apart from the conventional in-hand analysis of an expert jeweler, Software algorithms have been developed for automation of the task to some extent. The Software use imaging technology to photograph jewelry items at different time intervals and compare the photographs through intelligent algorithms to detect any changes. The Software analyzes the jewelry items by tracking size of stones, table facets, angles, inclusions in gemstones, etc. The laser inscriptions and identification markings, invisible to naked eye, are also used for determining the authenticity. Furthermore, RFID tags are also embedded and hidden inside the jewelry items for the purpose. The Software algorithms use these parameters for determining the originality and genuineness of these precious articles.

US patent application US20140312017A1 describes a system and method for determining authenticity of precious stones (cut diamonds and uncut diamonds) by applying laser marking on the surface of the article. The article surface is irradiated with laser lights of different wavelengths and interference images are stored. The stored data is compared to authenticity-checking interference images to determine the authenticity of the identification marking.

WIPO patent application WO2015023230A1 describes a method and system for certifying and verifying gemstones by capturing image of an inclusion in the gemstone. The image is displayed on a certification document which can be compared to the gemstone viewed through an optical device to determine if the gemstone matches the image. The certification document may also contain additional physical identification data like location of the inclusion using an x, y, z axis, gemstone's appearance, shape, size, weight, measurements, color, refractive index, specific gravity and absorption spectrum.

U.S. Pat. No. 9,373,011 describes system and method for identification and authentication of precious metals and small jewelry items using radio frequency identification ("RFID") technology. The RFID tag can be embedded in absorbing dielectric medium inside epoxy in a tiny cavity placed in the metal or jewelry. The RFID tag information can be transferred to a computer through the reader, and can be matched with preprogrammed information in a database.

Every piece of jewelry having a gemstone has a set of "gem holders", commonly known as prongs, which hold the gemstone in place. Prongs are basically small metal rods, part of the jewelry that is bent over to cover a gem and hold it in place. The primary reason why prong settings are preferred by many consumers is that they offer good security while still enabling light to enter the diamond for better brilliance. Besides that, prongs can also be easily modified to higher (makes diamond look larger) or lower positions (doesn't catch onto things easily) depending on person's choice. In addition to prongs, the gem holders setting in the jewelry item can be of various types like bezel, channel set, etc.

The prong setting used for holding the gemstone is an important aspect for determining any changes done to jewelry item or gemstone by the jeweler during repair or assessment. The current technology does not cater to using prong setting for the purpose.

SUMMARY OF THE INVENTION

According to an aspect of the present disclosure, a method for analysis of physical characteristics of a gemstone is disclosed. The method comprises the steps of receiving, by a computing device having a non-transitory computer-readable storage medium and a processor configured by executing a software program stored in the storage medium, a first set of images of the gemstone. The first set of images depict at least a girdle of the gemstone and are received from an image capturing device. Additionally, the method includes the step of processing, by the computing device, the first images to extract physical characteristics of at least the girdle. In particular, the step of processing the first set of images comprises identifying, from the first set of images, the physical characteristics of the girdle from the images. Additionally, the processing step includes the step of generating a diagram of at least the girdle. More specifically, the diagram is one or more of a point-to-point diagram and a line diagram and depicts the extracted physical characteristics of the girdle. Additionally, the processing step includes the step of measuring, by the computing device using one or more of the first set of images and the generated diagram of the girdle, values of the extracted physical characteristics of the girdle. Furthermore, the method includes the step of storing, by the computing device in a database record for the gemstone, current gemstone information for the gemstone that includes at least the generated diagram of the girdle and information representing the measured, extracted physical characteristics.

According to a further aspect of the disclosure a system for analysis of physical characteristics of a gemstone is disclosed. The system comprises an image capturing device for capturing a first set of images of the gemstone and that depict at least a girdle of the gemstone. The system further comprises a database and a computing device having a non-transitory computer-readable storage medium and a processor. Additionally, the processor is configured by executing a software application to process the first set of images using an image processing algorithm to extract physical characteristics of at least the girdle. More specifically, the processing includes identifying, from the first set of images, the physical characteristics of the girdle from the images. The processing also includes generating a diagram of at least the girdle, wherein the diagram is one or more of a point-to-point diagram and a line diagram and depicts the extracted physical characteristics of the girdle. Additionally, the processing includes measuring, using one or more of the first set of images and the generated diagram of the girdle, values of the extracted physical characteristics of the girdle. Furthermore, the processor is configured to store, in a database record for the gemstone, current gemstone information for the gemstone that includes at least the first set of images, the generated diagram of the girdle and information representing the measured, extracted physical characteristics. The system also includes an output display for displaying the current gemstone information.

BRIEF DESCRIPTION OF THE DRAWINGS

FIG. 5 illustrates an exemplary diamond report of Gemological Institute of America;

FIGS. 12a, 12b, 12c, 12d, 12e, 12f, 12g and 12h illustrates an exemplary mobile application of an online commerce platform for buying and selling the jewelry items;

DETAILED DESCRIPTION

Figure 1:
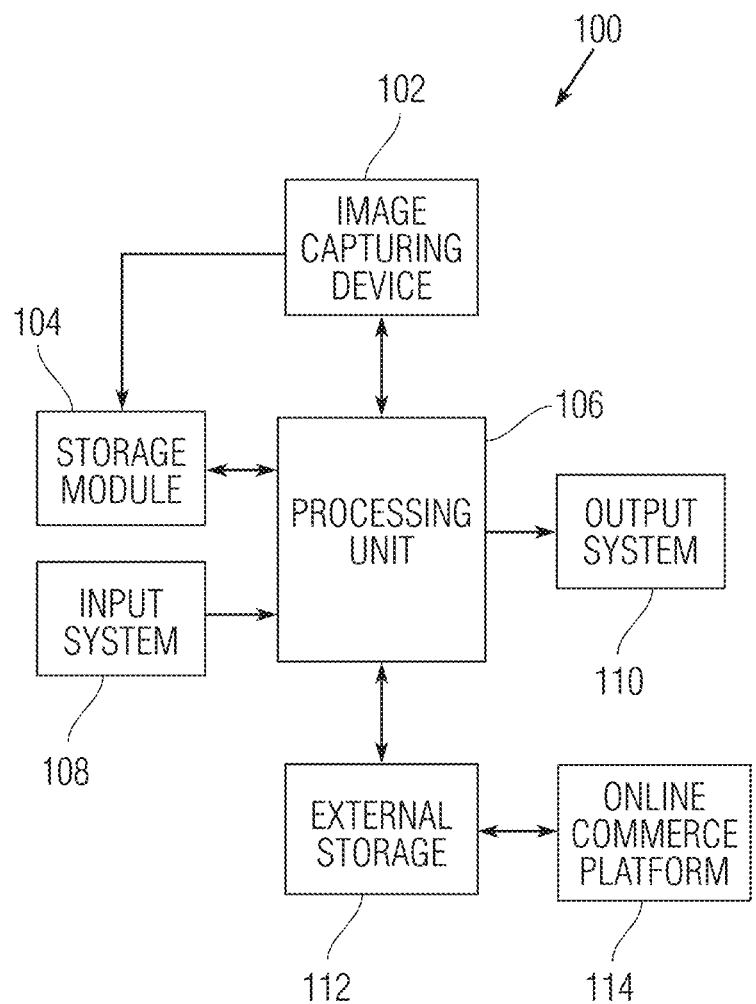
FIG. 1 illustrates a block diagram of a system embodying the teachings of the present invention.

While the disclosed subject matter is amenable to various modifications and alternative forms, specifics thereof have been shown by way of example in the drawings and will be described in detail. It should be understood, however, that the intention is not to limit aspects of the invention to the particular embodiments described. The intention is to cover all modifications, equivalents, and alternatives falling within the spirit and scope of the invention.

The following detailed description is made with reference to the figures. Exemplary embodiments are described to illustrate the subject matter of the disclosure, not to limit its scope, which is defined by the claims. Those skilled in the art will recognize that the various elements described and/or shown may be arranged in various combinations and configurations without departing from the scope of the disclosure.

All numbers or values are herein assumed to be modified by the term "about." The disclosure of numerical ranges by endpoints includes all numbers subsumed within that range (e.g., 1 to 5 includes 1, 1.5, 2, 2.75, 3, 3.80, 4, and 5).

As used in this specification and the appended claims, the singular indefinite articles "a", "an", and the definite article "the" should be considered to include or otherwise cover both single and plural referents unless the content clearly dictates otherwise. In other words, these articles are applicable to one or more referents. As used in this specification and the appended claims, the term "or" is generally employed to include or otherwise cover "and/or" unless the content clearly dictates otherwise.

FIG. 1 illustrates a block diagram of a system 100 embodying the teachings of the present invention. The system 100 includes an image capturing device 102 for capturing multiple images of a jewelry item. The image capturing device 102 takes images from various angles of the jewelry item including the gemstones, metal parts and the prongs. The physical characteristics of the jewelry item including the appearance, shape, size, measurements (length, width and depth) and color are captured through the images. The captured images can be in form of still images, video images or laser based topography model of the jewelry item. Exemplary image capturing device includes an analog or digital still image camera, a video camera, an optical camera, a laser camera, a laser or 3D image scanner, or any other device capable of capturing high resolution images of the jewelry item. The image capturing device 102 can also be a high definition inbuilt camera of a communication device such as a computer, a laptop or a mobile phone.

Figure 4:
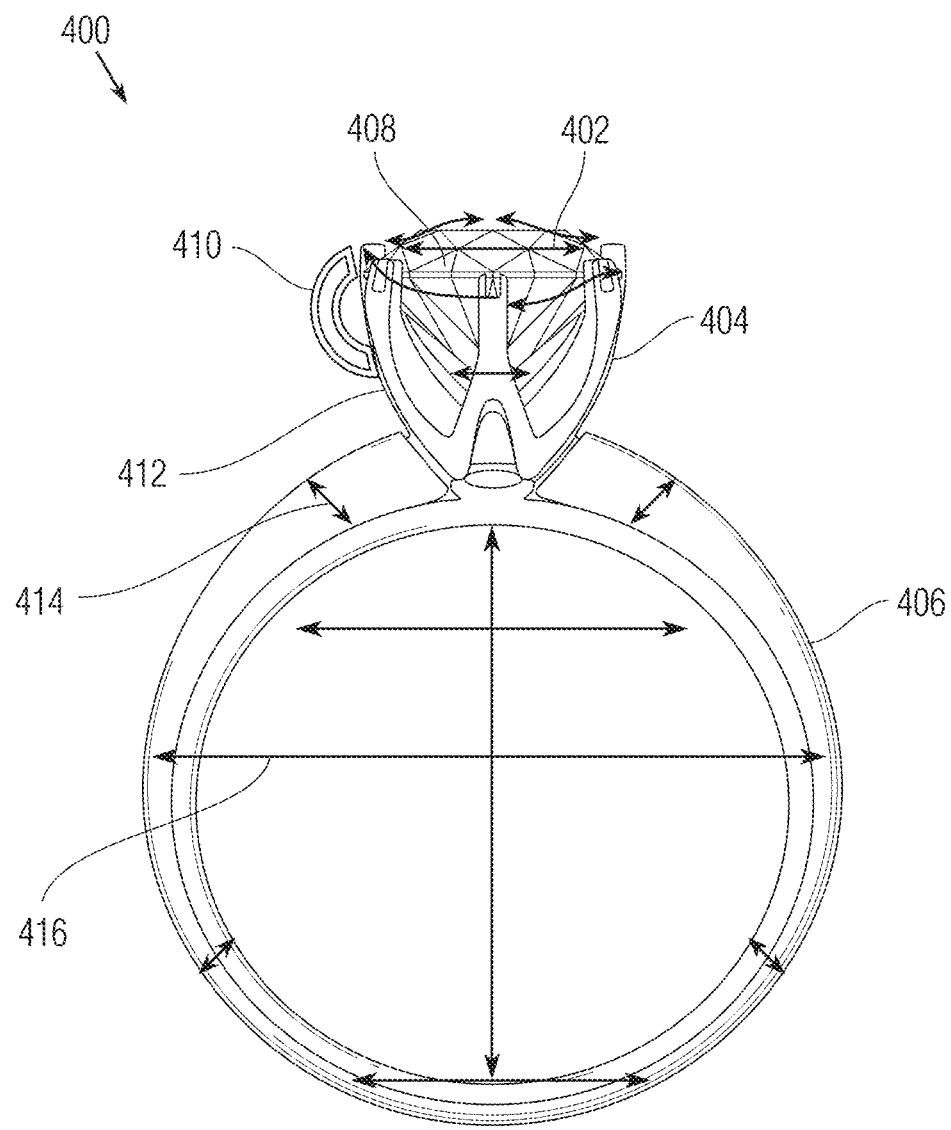
FIG. 4 illustrates the image of the jewelry item having a gemstone.

In an exemplary embodiment, the image capturing device can take multiple images of the jewelry item and stitch the images to get a 360° view. Alternatively, the 360° view can be captured using the panoramic view technology of the image capturing device 102. In a further alternative embodiment, the video image of the jewelry item is captured and still images are extracted from the video frames. FIG. 4 illustrates an image of a jewelry item 400 having a gemstone 402. The image capturing device 102 takes 3D images of the metal part 406, the gemstone 402 and the prongs 404.

The image capturing device 102 also captures the image of inclusions in the gemstone of the jewelry item. Examples of inclusions which may be captured include one or more of solid, liquid or gas inclusions, internal fissures, fractures, zones of crystal growth, stress cracks, bubbles, cleavage fault, feather, halo inclusions, two-phase and three-phase inclusions, etc. The image capturing device 102 further captures identification markings or inscriptions on the surface of the metal part or the gemstone of the jewelry item. Any nicks, scratches, dents, placements, table facets, bottom facets of gemstone, color change under lighting conditions, girdle facets and thickness are also captured through images.

The captured images through image capturing device 102 are stored in a storage module 104. The storage module 104 also stores a time stamp comprising the date and time and a location of capturing and storing the images. The storage module 104 can be an inbuilt storage memory of the image capturing device 102, for example the internal memory of a camera device. In an alternative embodiment, the storage module 104 can be storage memory of one or more of a server computer, a client user computer, a personal computer (PC), a tablet PC, a laptop computer, a desktop computer, a mobile phone, a control system and a network router, switch or bridge. Alternatively, the storage module 104 can be cloud storage of a virtual cloud environment.

The stored images are provided to a processing unit 106 for extracting the information from images and processing it for security analysis of the jewelry item. A user (herein 'user' refers to a jewelry owner, manufacturer, lab person, etc. and will be considered for the description below) can provide additional information of the jewelry item to the processing unit 106 through an input system 108. The additional information can be related to physical characteristics of the metal part and the gemstone like weight, volume, dimensions, carat, cut grade, color rating, etc. The user can also input information relating to price, labor, etc. of the jewelry item. A certificate or lab report of the jewelry item can also be entered manually or uploaded though the input system 108. FIG. 5 shows an exemplary diamond report of Gemological Institute of America. The report shows the physical characteristics of the diamond along with an image. Examples of input system 108 include a keyboard, a touch panel, an electronic or optical mouse, a gesture recognition system and a voice input system. The input system 108 provides the additional information through a user interface of software, a website or a mobile application.

The processing unit 106 extracts information from the jewelry item images captured at different time intervals using a software program and compare the information for detecting any changes in the metal part or gemstones of the jewelry item. The processing unit 106 can be an internal CPU of the image capturing device 102 like a digital camera. In an alternative embodiment of the present invention, the processing unit 106 can be the processing unit of one or more of a server computer, a client user computer, a personal computer (PC), a tablet PC, a laptop computer, a desktop computer, a mobile phone, a control system and a network router, switch or bridge. The processed information from the processing unit 106 is stored in the storage module 104 or an external storage 112.

The processed information of the jewelry item by the processing unit 106 is sent to an output system 110 which displays the information to the user. The output system 110 can display the information pertaining to the physical characteristics of the jewelry item including the appearance, shape, size, volume, weight, measurements (length, width and depth) and color. The information related to inclusions in the gemstones, inscriptions on the metal part and gemstones, nicks, scratches, dents, placements, angles of jewelry and prongs, stone quality, table facets, bottom facets of gem, girdle facets and thickness, weights and or all known and deduced information from the jewelry can be displayed to the user. All the above-mentioned information is extracted from the images of jewelry item taken at different time interval for comparison and reference. The time stamp related to capturing and storing the images are also displayed through the output system 100. In a preferred embodiment of the present invention, the output system 110 also shows the difference in prong settings of the jewelry item, holding the gemstones, before sending it for repairment and after receiving it from repairment. The processing unit 106 calculates the difference in the metal part and the gemstone based on the changes in the prong settings of the jewelry item. The difference in the metal part and the gemstone is also shown to the user as the actual value or a percentage of the difference. The output system 110 can also display an alert or a flag if the difference calculated by the processing unit 106 is more than a predefined threshold limit. The output system 110 can also display the information in form of a certificate including the physical characteristics and images of the jewelry item. The output system 110 can also show the valuation of the jewelry item calculated from the images of different time intervals. The difference in valuation is also shown to the user.

The external storage 112, which can be memory storage of a remote computer, a laptop, a mobile phone, a network router, a switch, a bridge or a virtual space in a cloud environment, is connected to an online commerce platform 114. The online commerce platform 114 enables the user to display the jewelry item, evaluate it by comparing with other similar jewelry items from other websites and sell the jewelry item. The online commerce platform 114 displays the physical characteristics and selling price of the jewelry item. The user can also select and buy or sell jewelry items from the online commerce platform 114 using an appropriate payment method.

Figure 2:
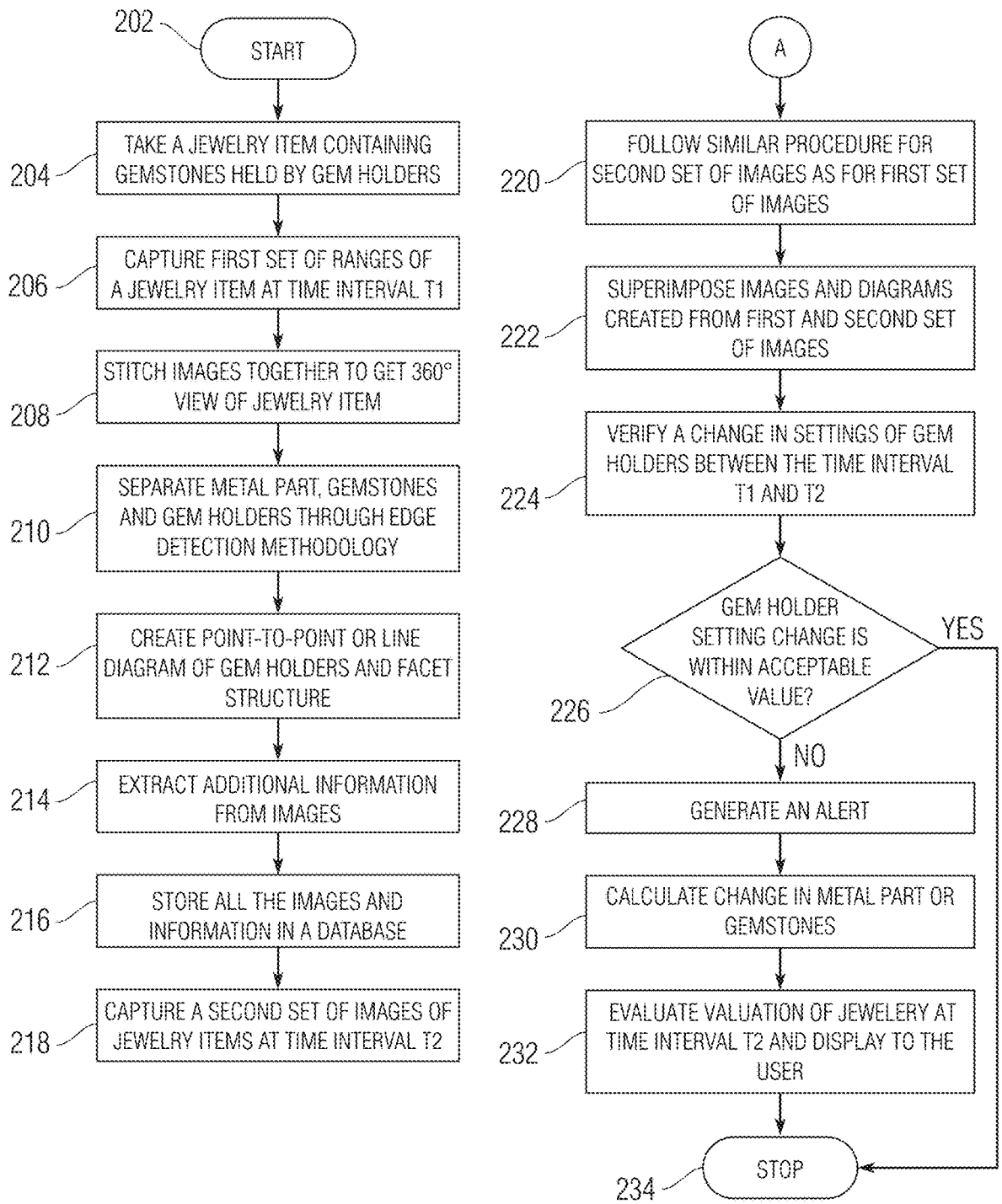
FIG. 2 illustrates a flowchart showing steps in an exemplary method for verification of a jewelry item.

FIG. 2 illustrates a flowchart showing steps for verification of a jewelry item. The process starts at step 202 and a jewelry item containing gemstones held by gem holders (prongs) is taken at step 204. At step 206 the image capturing device 102 takes a first set of images of the jewelry item at time interval T1. In an exemplary embodiment of the present invention, the time interval T1 is considered as the time before the jewelry item is sent to the jeweler for repair. The time T1 can also be any arbitrary time at which the images of jewelry item are taken and stored for reference in future. The images can also be captured at regular intervals by the user to keep a track of the wear and tear in the jewelry item with time. The first set of images includes the images of metal part, gemstones and the prongs of the jewelry item. In case the gemstones are missing or fallen from the jewelry item, the images of empty prongs are also captured. If the user provides the gemstones separately to the jeweler for fitting on the jewelry item, the images of gemstones are also captured for comparison with the jewelry item after it returns from the jeweler. The images are captured at high resolution to enable magnification for easy viewing and comparison. The captured images are stored in the storage module 104.

At step 208, the first set of images are stitched together to get a complete view of the jewelry item. The images can be stitched by the image capturing device 102. Alternatively, the images can be stitched by the processing unit 106. The stitched images are also stored in the storage module 104. A software algorithm running on the processing unit 106 extracts information from the first set of images and separates out the metal part, gemstones and the prongs of the jewelry item using an edge detection methodology at step 210. The algorithm creates a point-to-point or line diagram of the complete jewelry item including prongs and the facet structure at step 212 and separates out the various parts. The edge detection methodology is well known in the art and will not be discussed here in detail for the purpose of brevity of the subject. It should, however, be understood to a person skilled in the art that any other known technology can be used to separate the various parts of the jewelry item. The algorithm extracts one or more of the following information from the first set of images at step 214:

- Metal part dimensions, volume, angle, color and weight
- Metal quality/caratage
- Nicks, scratches, dents, cracks on the metal part or gemstones
- Inclusions in the gemstones
- Identification markings or inscriptions on the metal part and gemstones
- Table facet structure and girdle structure of gemstones
- Angle and height of gemstones
- Pavilion depth and angle
- Crown height and angle
- Weight and color of the gemstones
- Coverage of the gemstone surface area, i.e., is it too short (near edge) or too high (towards table) or correct distance
- Distance between the prongs
- How the prongs are placed in respect to one another and in respect to the gemstones
- Height and thickness of the prongs
- Facet structure and angles of the prongs
- Angle of curvature of the prong and its angle (facing others) compared to other prongs
- How high the gemstone is set in comparison to the prongs and to the other gemstones relatively
- Size and quality of any gemstone fallen or needs to be replaced
- Placement of the gemstones in relation to the prongs
- Are the gems overlapping each other or too near?
- Are the prongs touching the gem or not secure?
- Check size and shape of prongs next to it and around it and other areas. Are they same or for similar gems sizes and types?
- Are the Prongs of same type? How many types? How many of each type? The information mentioned above is exemplary and should not limit the scope of the invention. It should be clearly understood that the algorithm can extract any other information from the first set of images required for verification of the jewelry item.

The frontal view of a jewelry item 400 is illustrated in FIG. 4. The algorithm calculates the dimensions of various parts from the image of the jewelry item 400. Exemplary dimensions include girdle and table facet of gemstone and placement (408), angle of prong when bent and color recognition and/or outline of tips and sides and height of prong (410), thickness of prong & angle of bending from side view (412), volume and point to point marking to check for changes (414) and facial recognition of the ring using prongs, facet placement and inclusions etc. as markers (416).

Figure 6:
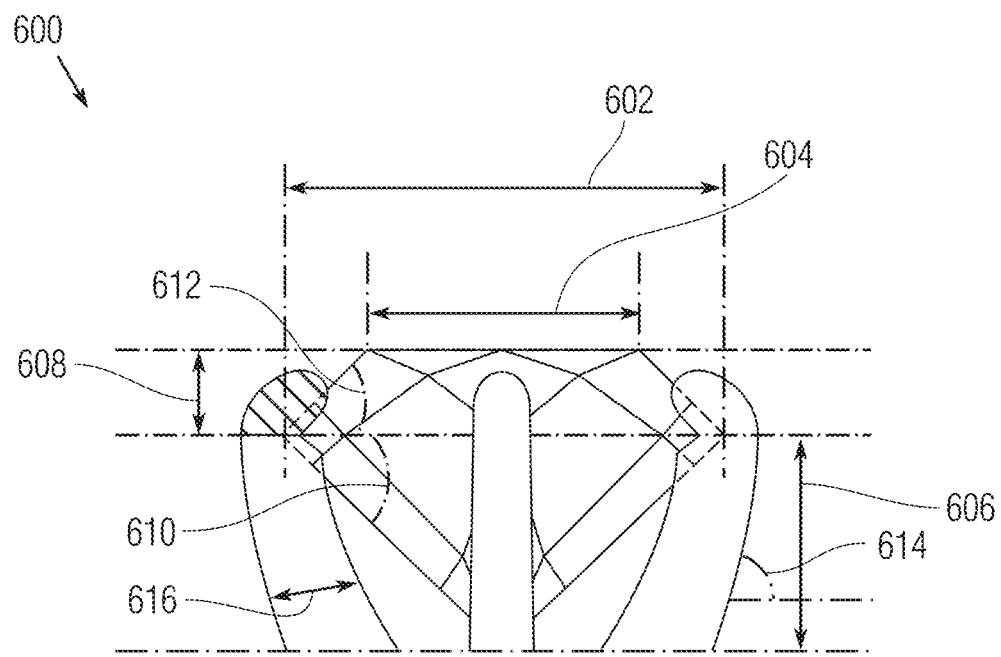
FIG. 6 illustrates a line diagram of the jewelry item.

FIG. 6 illustrates a line diagram of a jewelry item 600 created by the processing unit 106 from the first set of images. Some of the exemplary dimensions calculated from the line diagram include girdle diameter (602), table diameter (604), pavilion depth (606), crown height (608), pavilion angle (610) and crown angle (612) of the gemstone, angle of prong (614) and width of prong (616).

At step 216, the images, diagrams and extracted information is stored in the storage module 104. At step 218, a second set of images are captured at time interval T2 by the image capturing device 102. In a preferred embodiment of the present invention, the time interval T2 is the time when the jewelry item is returned from the jeweler after repairment. The time T2 can also be any arbitrary time at which the images of jewelry item are captured and stored for reference, for example, to check for wear and tear in the jewelry item. Similar steps were followed for second set of images as for the first set of images to separate the metal part, gemstones and prongs and extract the information from images at step 220. The second set of images, diagrams and extracted information are also stored in the storage module 104.

In an alternative embodiment of the present invention, the different set of images of the jewelry item can be captured at regular intervals of time to check for wear and tear and changes in the metal part and gemstones. These set of images can act as DNA map of the jewelry item to identify the changes happened in due course of time. The image data along with a passkey is passed along to the next owner/handler of the jewelry item. Updates to the item or verification of the item (re-check) for any changes made between first photo and receipt of physical delivery can be carried out before acceptance of the item using new photos and running the application to verify authenticity. If the old photo and new photo match and acceptance finalized, the passkey can be updated with the new ownership. These images can be provided to insurance companies, police, pawn shops and prospective buyers, etc. They can also get passkey from the user of jewelry item so that they can verify the authenticity, chain of ownership and accurate breakdown of the constituent products. The matching prongs and gemstone verification can allow the buyers to pay or value the metal part and gemstones much closer and more accurately. It can also let police and insurance companies to search the database if lost or stolen jewelry items are found. It further gives pawn shops or money lenders a better idea to ownership so that they have less risk while accepting to pawn the item. If a manufacturer makes multiple piece of the same jewelry item, it enables him to keep track of all the individual pieces accurately.

Figures 7A, 7B:
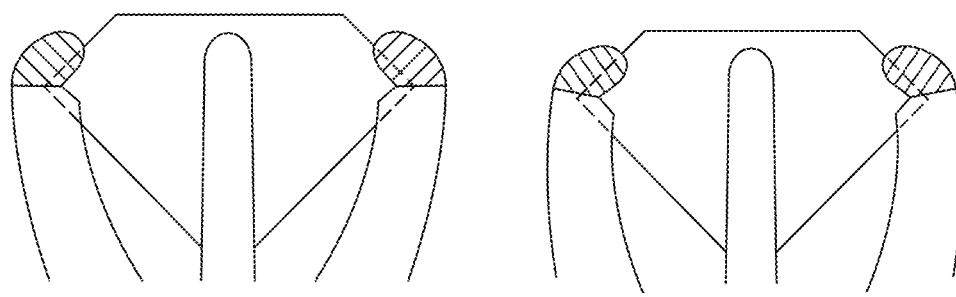
FIG. 7a illustrates a line diagram of the jewelry item at a time interval T1.
FIG. 7b illustrates a line diagram of the jewelry item at a time interval T1.
Figure 7C:
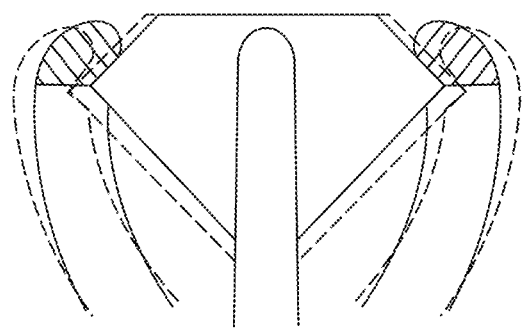
FIG. 7c shows the superimposed image of FIG. 7a and FIG. 7b.

The first set and second set of images and the line diagrams created from the images are superimposed at step 222 to verify a change in the images between the time interval T1 and T2. FIGS. 7a and 7b illustrates the line diagrams the jewelry item created from first and second set of images, respectively. FIG. 7c shows the superimposed image of FIGS. 7a and 7b to verify changes in the prongs settings of the jewelry item at step 224. For example, the changes in distance between the prongs, height and thickness of the prongs, position of prongs with respect to the gemstones, angle of curvature of the prongs and its angle compared to other prongs, prong to prong height and seat size ratios, etc. It should be clearly understood that the above mentioned parameters are exemplary and the algorithm can take into account various other parameters required for verifying the changes in prong settings. The algorithm calculates these changes on pixel-to-pixel basis from the superimposed image and displays all the changes on the output system 110. The algorithm checks if the changes are within a predefined threshold limit at step 226 and generates an alert or a flag if any of the change is more than the threshold limit at step 228. Based on the changes in the prongs, the algorithm calculates the changes in metal part and gemstones of the jewelry item at step 230. For example, changes in dimensions of the gemstone (crown height, pavilion depth, table diameter, pavilion angle, crown angle, etc.), size and volume of the metal part, etc. This enables the user to know what changes have been done to the jewelry item during repair and whether these changes are within the acceptable limit. In an exemplary embodiment, if the gemstone needs to be replaced in the jewelry item, the user can verify from the output information if the replaced gemstone matches the value and size of the previous gemstone. If the size varies more than an algorithmic value, question can be raised to the jeweler who replaced the gemstone. If the algorithm includes the capability of automatic appraisal of the jewelry item, it evaluates the valuation of the jewelry item at time interval T2 and displays it to the user at step 232 on the output system 110. This enables the user to compare the valuation of jewelry item at time T2 with the known valuation at time T1. The process stops at step 234.

Figures 8A, 8B:
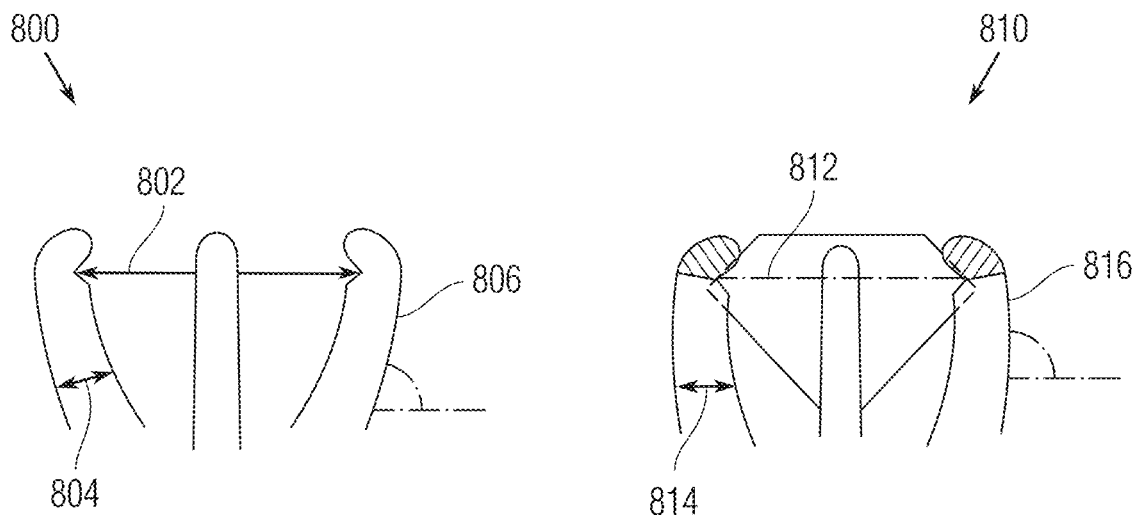
FIG. 8a illustrates a line diagram of the jewelry item with gemstone removed from the prongs at time interval T1.
FIG. 8b illustrates a line diagram of the jewelry item at time interval T2 after the gemstone is set between the prongs.

FIG. 8a illustrates a line diagram of the jewelry item with gemstone removed from the prongs at time interval T1. The software algorithm running on the processing unit 106 calculates the distance between the prongs 802, width of the prong 804 and angle of curvature of the prong 806. The algorithm can also estimate the size and weight of a gemstone which can be best fitted between the prongs. The calculated values are stored in the storage module 104. In an exemplary embodiment, the images of jewelry item, the line diagram 800 and the calculated values are sent to a jeweler to know if the jeweler has the gemstone of required size and weight. If the required gemstone is available in stock, the jeweler sends the image of the gemstone to the user for reference. The jewelry item is then sent to a jeweler for setting the gemstone between the prongs. The jewelry item is received from the jeweler with fitted gemstone and its images are again captured. FIG. 8b illustrates a line diagram of the jewelry item at time interval T2 after a gemstone is set between the prongs. The software algorithm again calculates the distance between the prongs 812, width of the prong 814 and angle of curvature of the prong 816. The calculated values are stored in the storage module 104. The algorithm calculates the difference between the corresponding stored values to verify the changes and displays it on the output system 110. An alert or a flag is generated if the difference is more than predefined values (considering wear and tear during setting of the gemstone). In such a scenario, the user can question the jeweler to verify for the fitted gemstone and the loss of metal part.

Figure 9A:
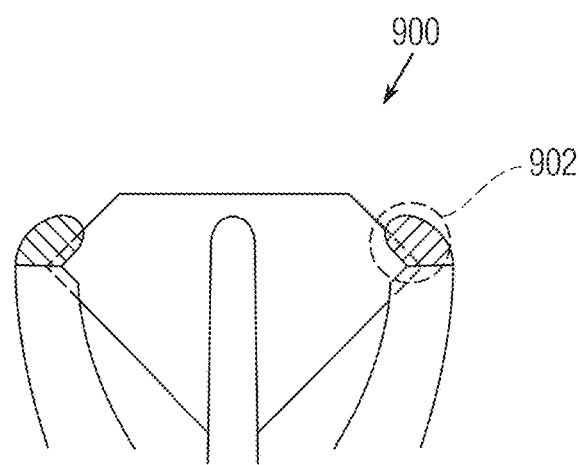
FIGS. 9a and 9b illustrates the line diagrams of the jewelry item with different prong size at time interval T1 and T2, respectively.
Figure 9B:
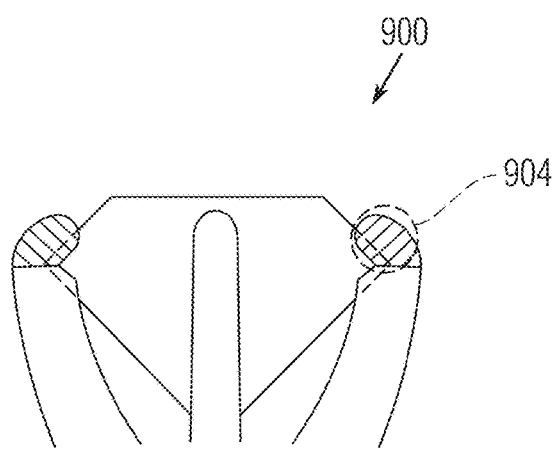

FIGS. 9a and 9b illustrates the line diagrams of a jewelry item 900 at time interval T1 and T2, respectively. The prong size 904 has been changed at time interval T2 when the jewelry item is received from the jeweler after repairment. The software algorithm calculates the difference between the prong sizes 902 and 904 and generates an alert accordingly.

Figure 10:
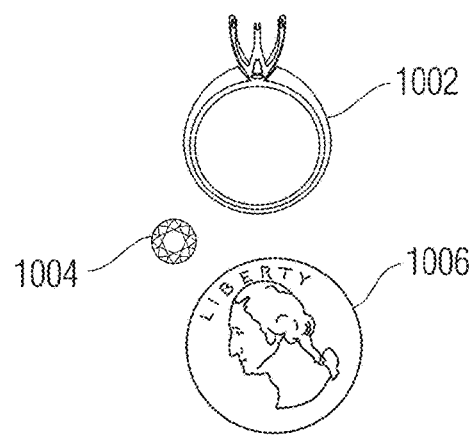
FIG. 10 shows an image of a ring, a gemstone and a standard size coin.

In an alternative embodiment, the user has the gemstone to be fitted in the jewelry item. The user clicks an image of the jewelry item and the gemstone along with an object of standard size (for example coin). This enables the user to know the actual size of the jewelry item and the gemstone, irrespective of the image zoom size, by comparing it with the standard size of the coin. FIG. 10 shows an image of a ring 1002, a gemstone 1004 and a standard size coin 1006. The actual size of ring 1002 and the gemstone 1004 can be easily known by comparing it with coin 1006. The software algorithm running on the processing unit 106 also extracts the information of inclusions in the gemstone 1004 and identification markings on the ring 1002 and gemstone 1004 (if any). The algorithm compares the information to verify the changes in the ring 1002 and the gemstone 1004 between the time intervals T1 and T2.

In a further embodiment, the present invention provides a security in buying a jewelry item through an e-commerce platform. The e-commerce platform can provide 360° images of the jewelry items to a buyer including the gemstones, metal part and the prongs. The buyer can store the images in the storage module 104 and process it using the software algorithm running on the processing unit 106. The algorithm extracts all the information from the images and stores in the storage module 104. After the actual receipt of the jewelry item by the buyer, the images are again captured and information is extracted by the algorithm. The extracted information is compared with the stored information to verify if the same jewelry item is received. This helps to detect any fraud by the company of e-commerce platform or during the transit of the jewelry item.

Figure 11A:
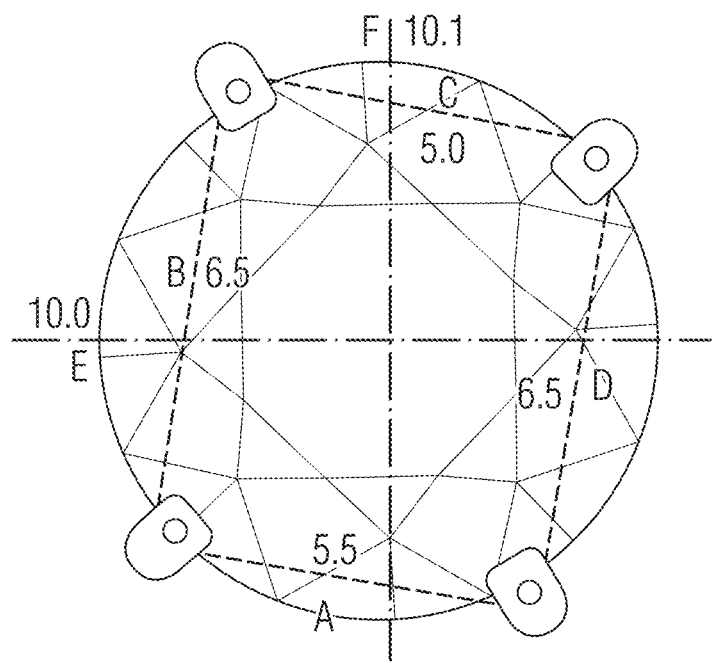
FIG. 11a illustrates the top view of the jewelry item with an initial set gemstone.
Figure 11B:
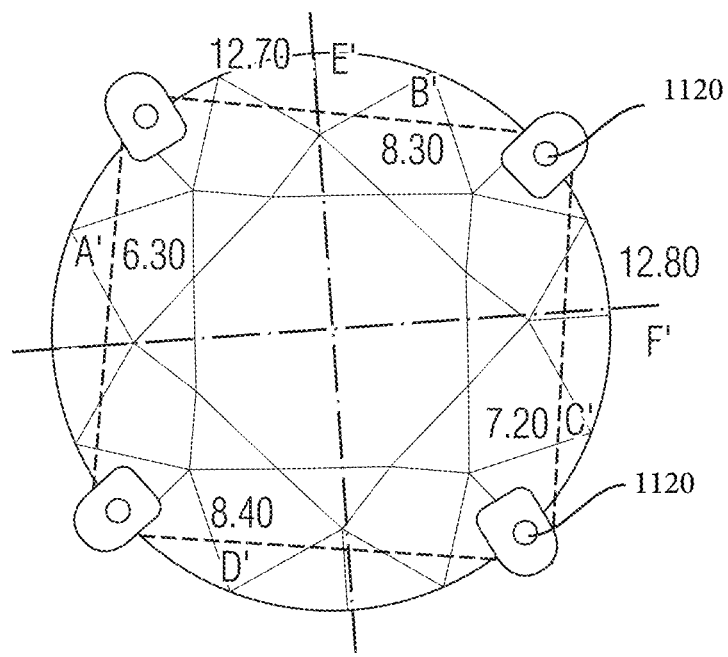
FIG. 11b illustrates the top view of the jewelry item with the same gemstone reset in the jewelry item.

FIG. 11a illustrates the top view of a jewelry item with an initial set gemstone. FIG. 11b illustrates the top view of the jewelry item with the same gemstone reset in the jewelry item. The FIGS. 11a and 11b shows various dimensions of the gemstone and the prongs. The tips of the prongs have also been changed before and after reset of the diamond as shown in FIGS. 11a and 11b. It should be noted that the figures are for illustrative purpose and are not drawn to scale.

Diamond size (as obtained from diamond lab report)–6.36-6.39×4.13 mm

Ratio of the diamond size=6.36/6.39=0.995305

Ratio of the lines passing through the diagonal of the gemstone:

$$E'/12.70/10.00=1.27$$

$$F'/12.80/10.10=1.267$$

Calculating the percentage difference between the calculated values and diamond size 12.80×0.995305=12.734

Percentage (%) error=(12.80−12.734)/12.80× 100=0.549<1%

Therefore, the deviation in the prong setting will be acceptable if the difference in corresponding values of FIGS. 11a and 11b is less than 1%.

Considering the prong to prong distance in FIG. 11a

$$A: 5.55 \times (1.27, 1.267) = \text{Average}(7.0485, 7.03185)$$
$$\pm 1\% = 6.969 \qquad 1.$$

$$B: 6.50 \times (1.27, 1.267) = \text{Average}(8.255, 8.2355)$$
$$\pm 1\% = 8.327 \qquad 2.$$

$$C: 6.00 \times (1.27, 1.267) = \text{Average}(7.62, 7.602) \pm 1\% = 7.687 \qquad 3.$$

$$D: 6.50 \times (1.27, 1.267) = \text{Average}(8.255, 8.2355)$$
$$\pm 1\% = 8.327 \qquad 4.$$

Comparing the calculated values from the above equations 1, 2, 3, 4 with the prong to prong distance in FIG. 11b

$$A': (6.80-6.969)/6.80 \times 100 = 2.49\% \text{ (not acceptable value greater than 1\%)} \qquad 1.$$

$$B': (8.30-8.327)/8.30 \times 100 = 0.333\% \text{ (acceptable value less than 1\%)} \qquad 2.$$

$$C': (7.20-7.687)/7.20 \times 100 = 6.765\% \text{ (not acceptable value greater than 1\%)} \qquad 3.$$

$$D': (8.40-8.327)/8.40 \times 100 = -0.860\% \text{ (acceptable value less than 1\%)} \qquad 4.$$

In general, 2 prongs are needed to be opened to remove the gemstone from the jewelry item. The percentage change in the prong to prong distance after resetting can conclude which prongs were opened during repairment. For the calculated values which have more than 1% deviation in the above equations, the software algorithm running on processing unit 106 will generate an alert or a flag which will be displayed on the output system 110.

Figure 3:
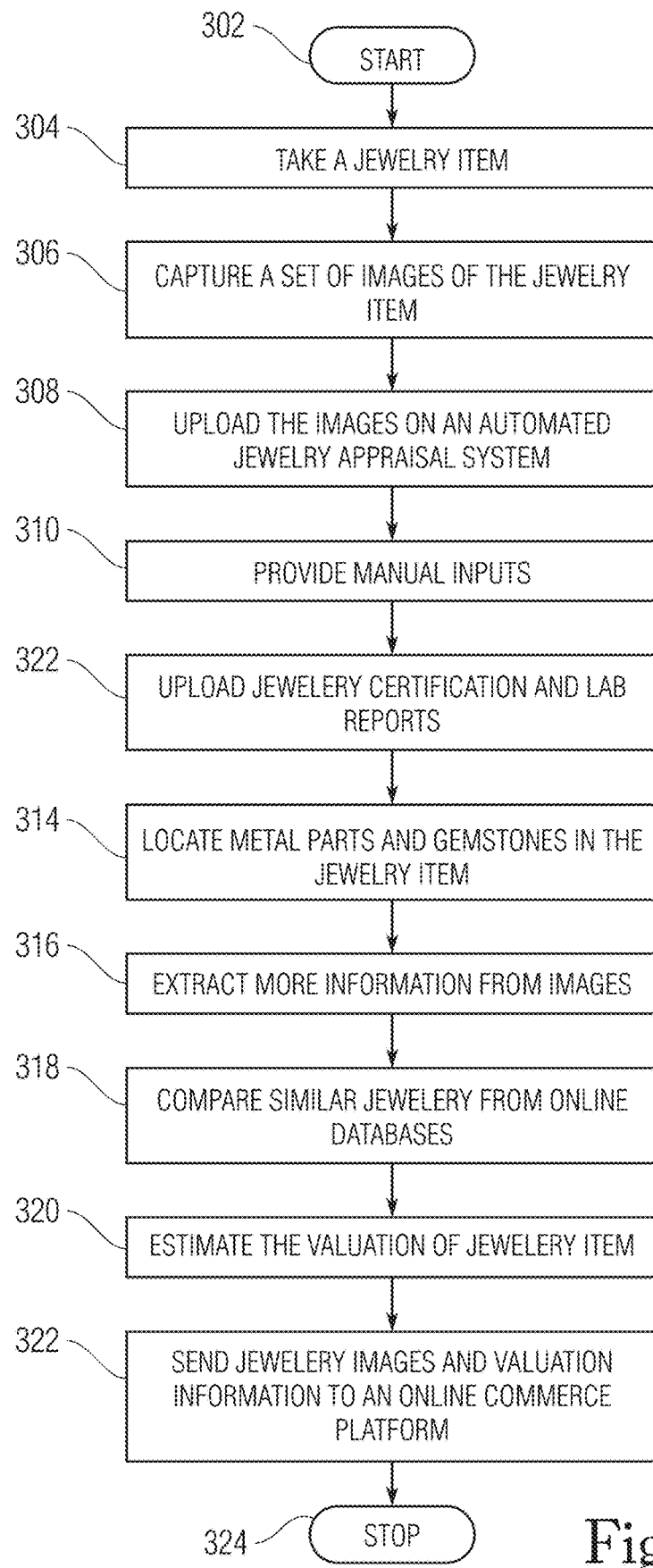
FIG. 3 illustrates a flowchart showing steps for online appraisal of the jewelry item.

FIG. 3 illustrates a flowchart showing steps for online appraisal of the jewelry item. The process starts at step 302 and a jewelry item is taken at step 304. A set of images of the jewelry item are captured using the image capturing device at step 306. The images are captured along with an object of standard dimensions, like a coin of standard size. This enables to calculate the exact size of the jewelry item and the angle of picture taken irrespective of the zoom view of the image. The set of images capture a complete view of the jewelry item. At step 308, the captured images are uploaded on an automated jewelry appraisal system. The automated jewelry appraisal system can be a software application running on a server computer, a client user computer, a mobile phone, a control system and a network router, switch or bridge. Alternatively, the software application can be running on a virtual computing system of a cloud environment. At step 310, the user can provide manual inputs in the automated jewelry appraisal system. For example, the user can input physical characteristics of the metal part and the gemstones like weight, volume, dimensions, carat, cut grade, color rating, etc. The user can also upload jewelry certification and lab reports at step 312 obtained from jewelry certification organizations like Gemological Institute of America, The International Gemological Institute, European, Gemological Laboratory, etc. At step 314, the software application automatically detects the metal parts and the gemstones in the jewelry item. The software application can use, for example, edge detection technology or any other methodology to create a point-to-point diagram or a line-wire diagram of the jewelry item. At step 316, the software application extract more information from the images, like size, weight, carat, color grade, clarity, cut proportions, polish, etc. The automated jewelry appraisal system access different online jewelry databases or websites, like zeales, Kitco, etc. to find jewelry items and gemstones with similar parameters, like color grade, prong styles, type of metal, design styles, etc. The data and valuation of these similar jewelry items is received and compared with the user jewelry item at step 318. The software application then estimate the valuation of the jewelry item at step 320 based on all the extracted information. At step 322, the gemstone or jewelry images and valuation is sent to an online commerce platform for displaying and selling the jewelry item. The process stops at step 324.

Figure 12A:
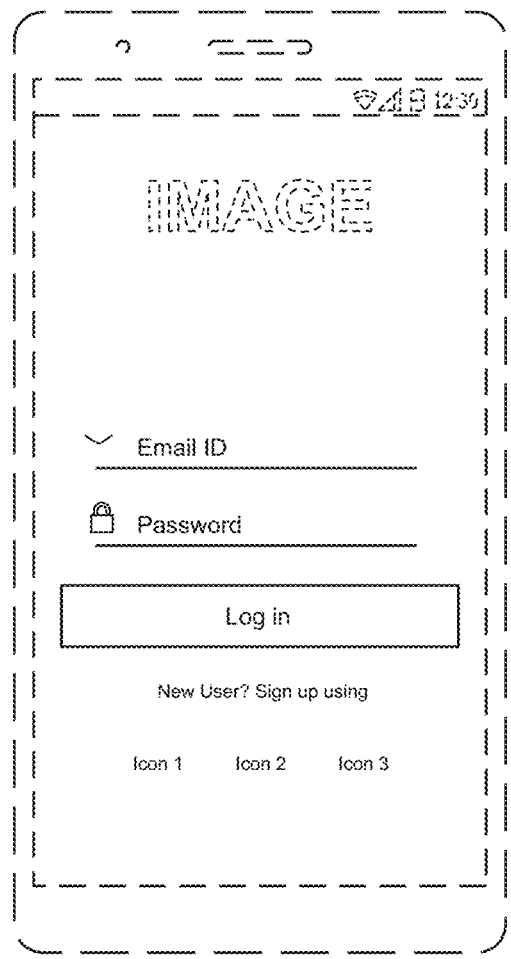
Figure 12B:
Figure 12C:
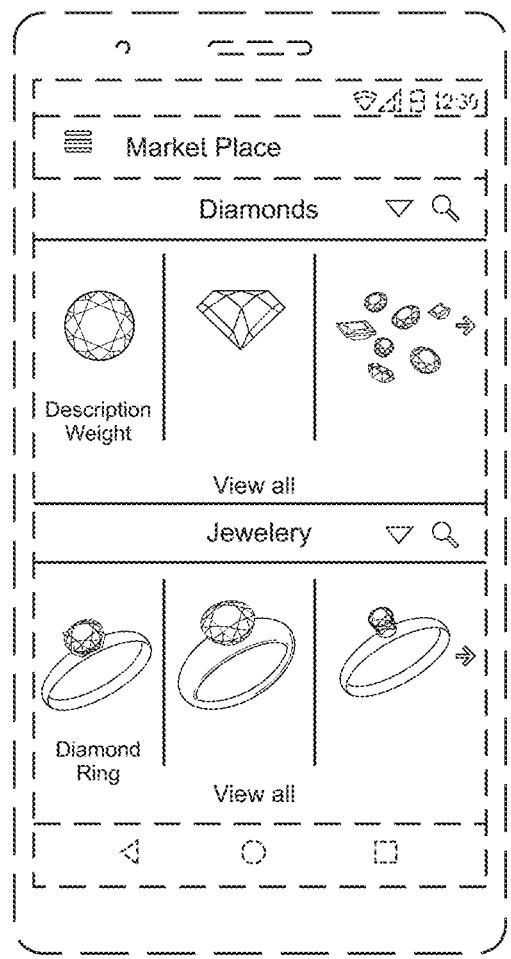
Figure 12D:
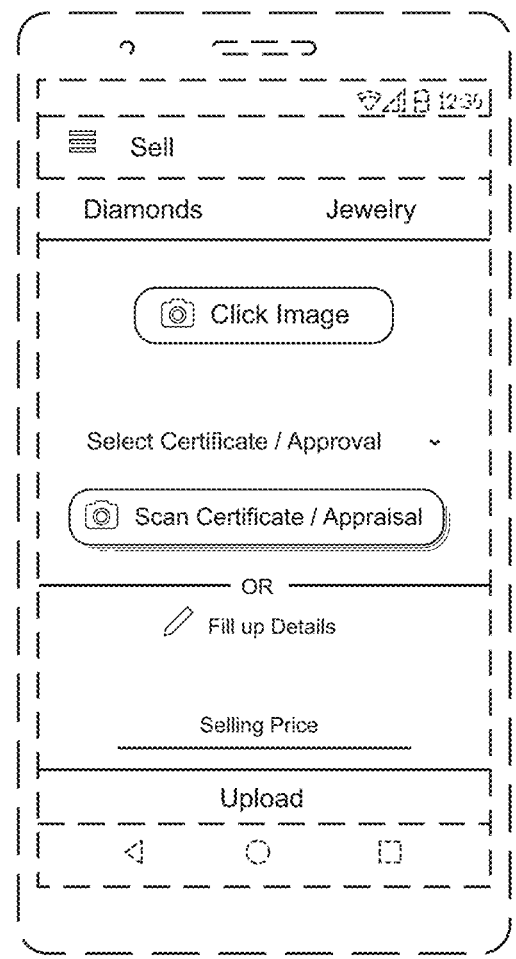
Figures 12E, 12F:
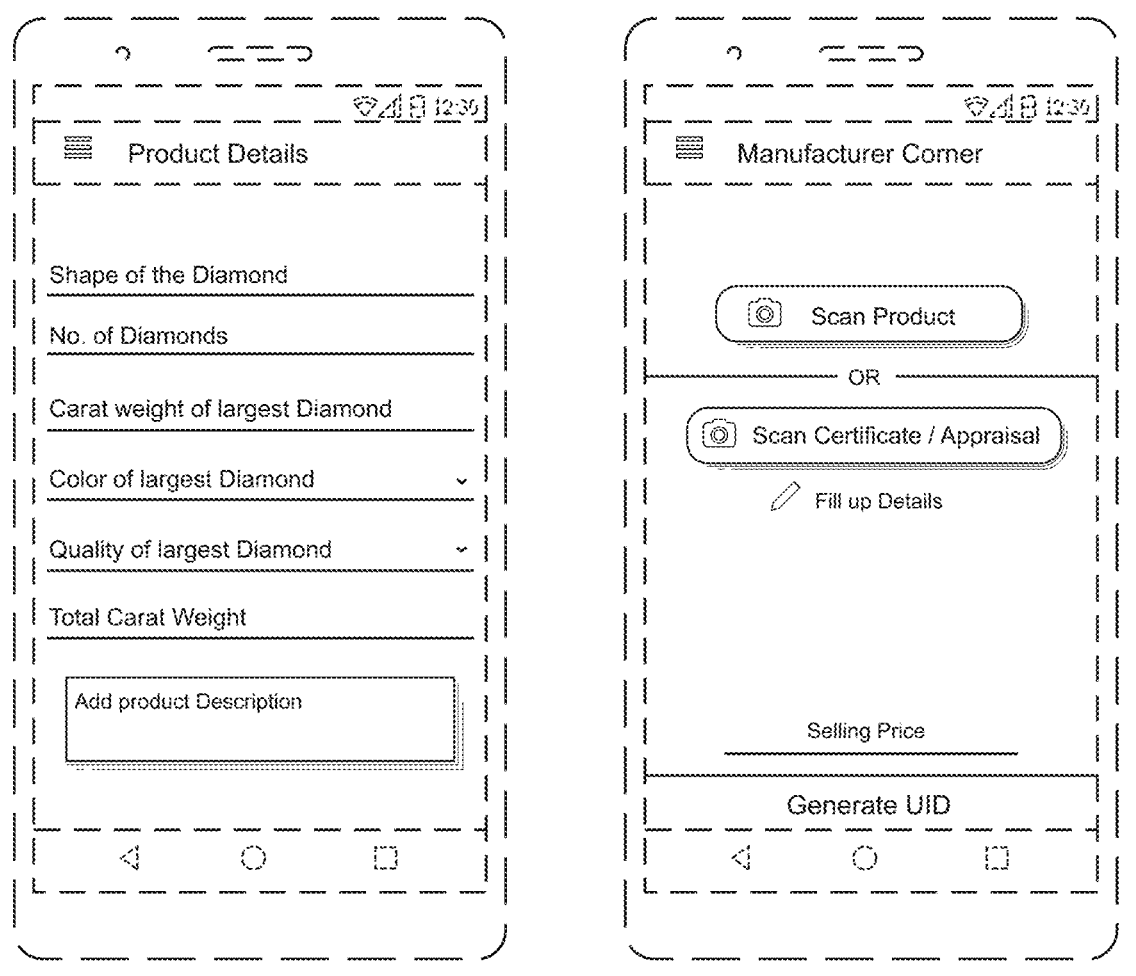
Figure 12G:
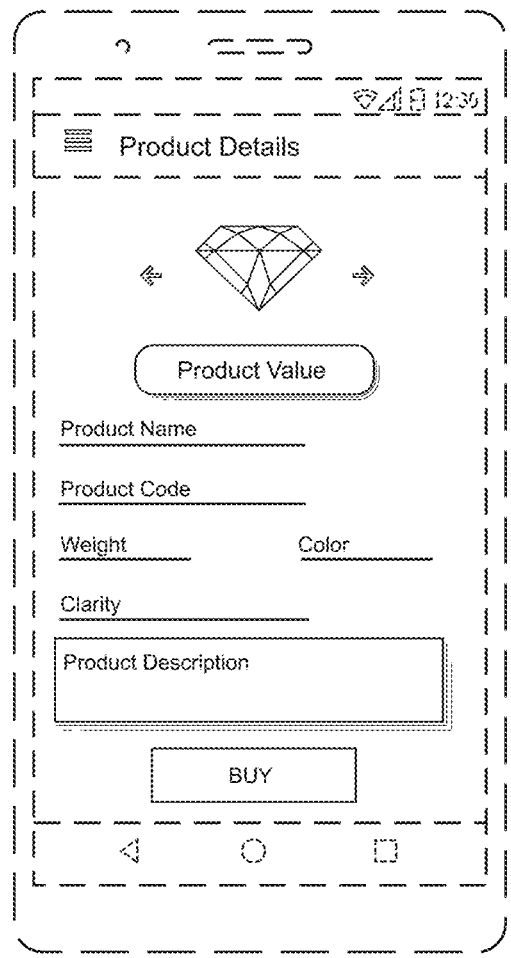
Figure 12H:
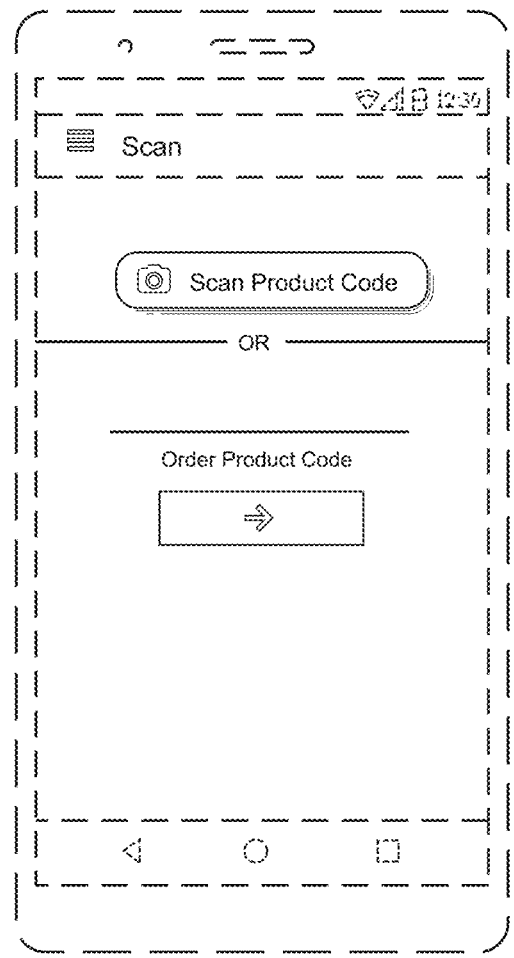

FIGS. 12a, 12b, 12c, 12d, 12e, 12f, 12g and 12h illustrates an exemplary mobile application of an online commerce platform for buying and selling jewelry items. A buyer or a seller of the jewelry item can create his/her profile in the mobile application and can login with the credentials as shown in FIG. 12a. The platform provides various functionalities to the buyer or seller like a 'marketplace' to buy gemstones and jewelry items available from different sellers, "sell your item" to sell its own gemstones and jewelry items, 'scan' to upload the images and lab certificates of the gemstones and jewelry items, etc. as shown in FIG. 12b. FIG. 12c shows a marketplace of the online commerce platform where the buyer or seller can view the details and pricing of the diamonds and jewelry items placed by different sellers on the platform. FIG. 12d shows the functionality of selling diamonds and jewelry items by clicking and uploading its images. The seller can also scan and upload certificates and appraisal reports provided by jewelry certification organizations like Gemological Institute of America, etc. The selling price of the item can also be inputted by the seller. FIG. 12e shows a user interface for inputting the product details for placing the product on the platform for selling. FIG. 12f shows a manufacturer corner for scanning and uploading certificates and appraisal reports by the manufacturer of the product. FIG. 12g shows the functionality of buying a product from the online commerce platform. On selecting an available product, the buyer can see all the product details and can buy the product. The buyer or seller can also scan or input a product code of the jewelry item or gemstone to find the product information such as price comparisons and user reviews of similar products available online on the platform as shown in FIG. 12h.

In accordance with these and other aspects of the disclosure, additional configurations and variations of the disclosed systems and methods for verification of a jewelry item are further described herein.

The foregoing has included discussion about a diamond's girdle, like its bearding, hills, valleys, small dents, etc.; however, such features are not used for performing gemstone verification.

Gemstone verification can involve gemstone characterization which includes operations for analyzing gemstone images and other measured data to detect and extract (e.g., measure or derive) a unique combination of gemstone features that are usable to identify and differentiate each unique gemstone. Gemstone characterization can also include generating a record of gemstone identification information, which can include one or more digital visual representations of gemstone features and/or other encoded information representing gemstone features. Such a record can be stored in a database record and is usable to perform further security verifications and operations. Gemstone verification can also include authenticity verification, which involves matching all or part of a query set of images and/or gemstone identification information against one or more previously registered records for the purposes of identifying or authenticating a gemstone and to determine whether any unauthorized alterations have been made to a gemstone. Gemstone verification can also include identifying any changes made to a gemstone over time and recording information concerning these changes in the database record for the gemstone to provide a complete and verified history of the gemstone and changes over time. In accordance with one or more embodiments, the system is further configured to utilize the unique combination of physical characteristics of a gemstone including any combination of the foregoing as a security factor to perform or authorize the gemstone wearer/owner to perform various secure operations and transactions.

Although the exemplary embodiments of the system 100 described herein are primarily discussed as performing gemstone verification based on physical characteristics of the girdle of a gemstone, the system can similarly perform verification based on extracted physical characteristics of other parts of the gemstone (e.g., its facet structure, inclusions and the like) as well as other parts of a jewelry item that the gemstone might be combined with including a metal part, gem holders that hold the gemstone to the metal part, such as prongs. Characterization of the girdle and its use in uniquely identifying a gemstone is a salient aspect of several embodiments in accordance with the present disclosure.

Figure 13A:
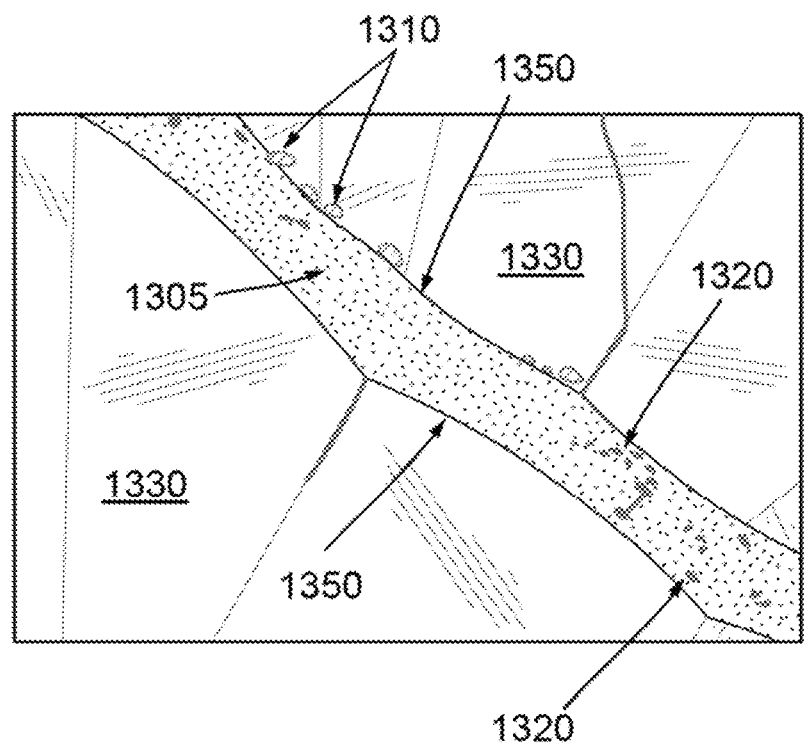
FIG. 13A is a photograph of part of a gem's girdle captured using a digital camera from a top-side perspective view in accordance with an embodiment.
Figure 13B:
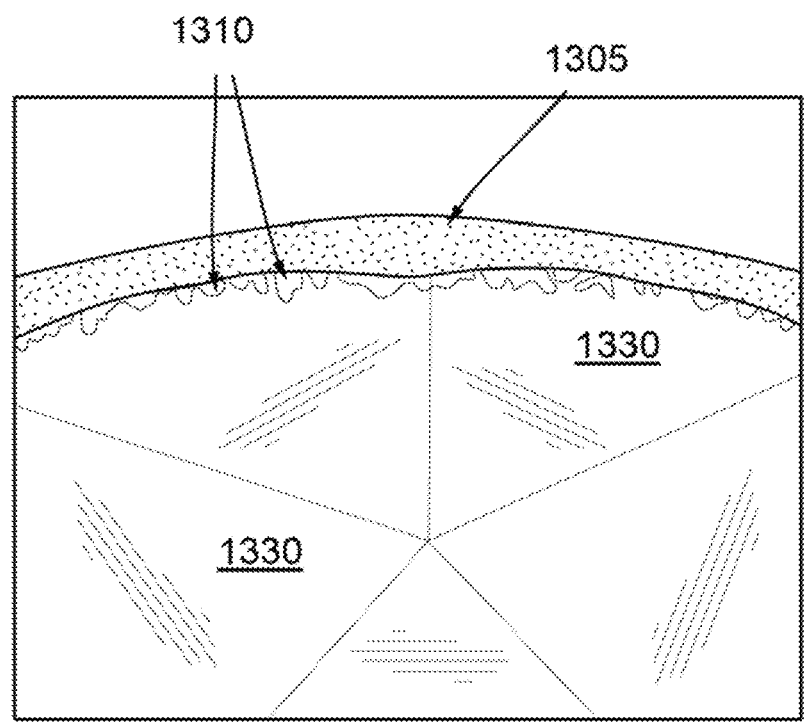
FIG. 13B is a photograph of part of a gem's girdle captured using a digital camera from a bottom-side perspective view in accordance with an embodiment.

In accordance with one or more embodiments, the system 100 is configured to image, analyze and measure physical characteristics of a gemstone, particularly its girdle, and utilize the measured features, differences in the gem girdle and minute detailed differences that occur along the length of the girdle to identify a gemstone. In this regard, the system 100 can be configured to use the image capturing device 102 to capture one or more images of a gemstone including its girdle, which typically extends peripherally about the side of the gemstone. Image(s) generally refers to a digital visual representation of the gemstone that can be captured using photo, video, laser-based tomography and other such three-dimensional scanning devices. Images can be captured under normal lighting and/or under special lighting conditions. For example, FIG. 13A is a photograph captured of part of a gem's girdle captured using a digital camera from a top-side perspective view (left image) and FIG. 13B is a photograph of the same gem's girdle from a bottom-side perspective view (right). The simplified gemstone images of FIGS. 13A and 13B, illustrate some exemplary features pertaining to the girdle 1305 of the gemstone including, the top and bottom edges 1350 where the girdle intersects with adjacent facets 1330, girdle bearding features 1310 that are typically near the edges of the girdle (e.g., either on the face of the girdle or adjacent facets 1330), natural or man-made imperfections 1320.

The images can be stored in a storage module 104 and provided to a processing unit 106, which, by executing one or more of the exemplary processing methods further described herein, is configured to extract information from the gemstone image, particularly, information concerning features (i.e., physical characteristics) of the girdle. The processing unit can also extract features of other parts of the gemstone in addition to the girdle, say, neighboring facets. As noted, optionally, additional features of the gemstone or jewelry item as a whole can be measured as well. Physical characteristics of a gemstone or jewelry item extracted from the images can also be generally referred to as herein feature data.

Figure 13C:
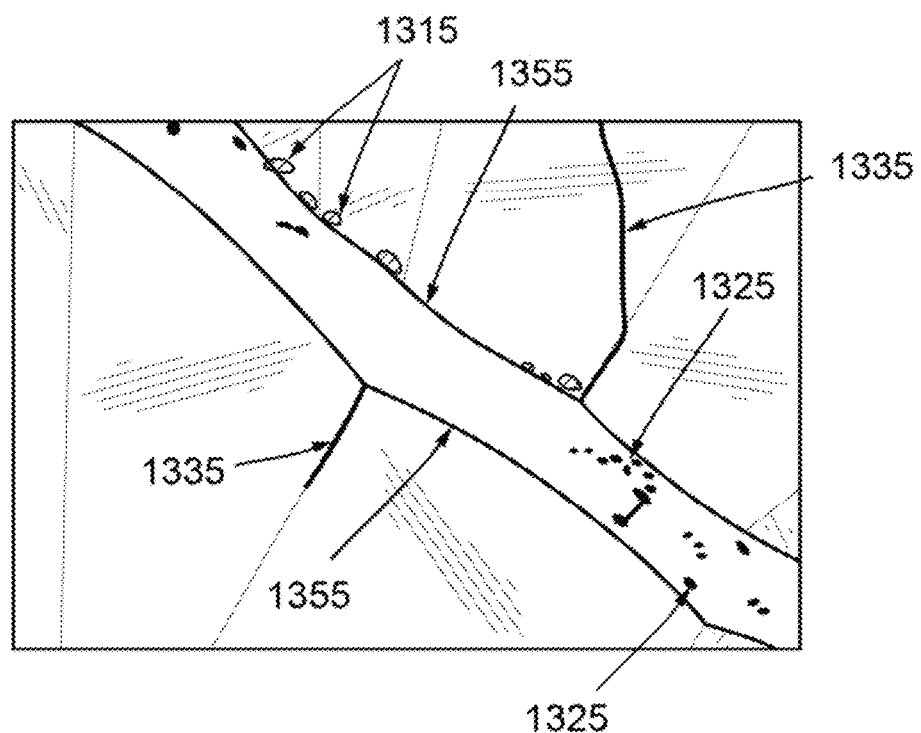
FIG. 13C is an exemplary line to line and point to point diagram of gemstone features including the girdle of the gemstone shown in FIG. 13A generated in accordance with an embodiment.
Figure 13D:
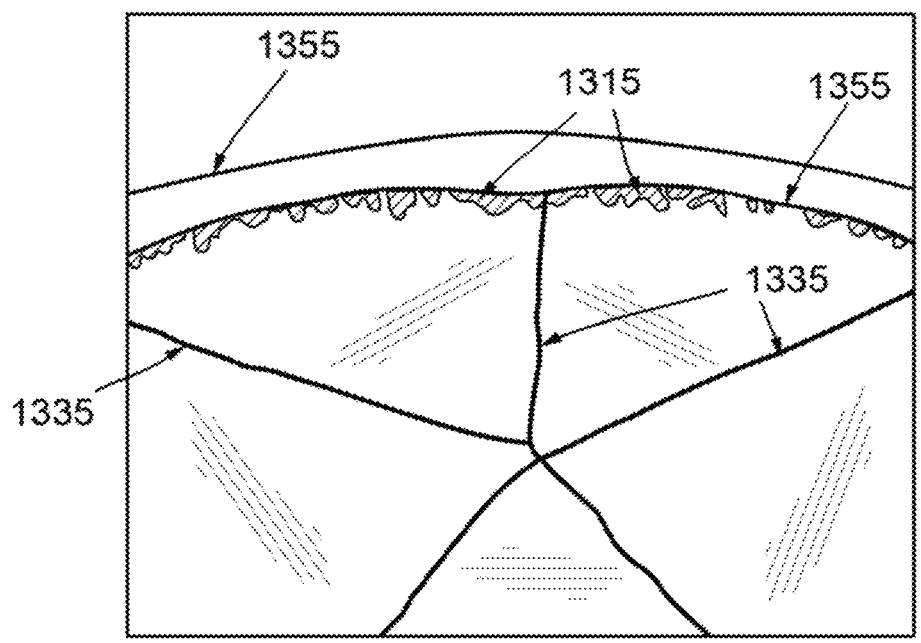
FIG. 13D is an exemplary line to line and point to point diagram of gemstone features including the girdle of the gemstone shown in FIG. 13B generated in accordance with an embodiment.

More specifically, the processing unit 106 is configured to extract unique set of characteristics of the gemstone using the girdle and facets of the gemstone that define the edges of the girdle. Additionally, the processing unit can be configured to create a line to line and point to point diagram or 3D image representation of a length of the girdle. FIG. 13C is an exemplary line to line and point to point diagram of the girdle shown in FIG. 13A wherein the line to line and point to point diagram is overlaid over the image of FIG. 13A. FIG. 13D is an exemplary line to line and point to point diagram of the girdle shown in FIG. 13B wherein the line to line and point to point diagram is overlaid over the image of FIG. 13B. In the exemplary diagrams illustrated in FIGS. 13C and 13D, girdle bearding features are shown as lines, points or cross-hatched areas 1315, girdle features such as natural or man-made imperfections are shown as solid lines or points 1325, edges of the facets are shown as solid lines 1335, and edges of the girdle are shown as solid lines 1355.

From the diagram, particularly, the lines that mark the top and bottom edges of the girdle, the processing unit 106 can be further configured to identify the valleys and peaks of the girdle and measure the distance between those features, e.g., the height of the girdle at one or more points. The processing unit can also be configured to extract (e.g., measure or quantify) other physical characteristics of the girdle based on the images and/or resulting diagram including, for example, the change in the girdle height along the length of the girdle, the wave-like pattern defined by one or more the girdle edges, the particular location, size and pattern of junctures between adjacent segments (e.g., facets) of the girdle. Additionally, the processor can be configured to measure girdle bearding features. In an embodiment, the processing unit can implement a trained Neural Network, which can be trained on training images to detect and classify features of the girdle including bearding, scratches, inclusions, and the like. Other image analysis and feature detection algorithms can be used to identify girdle features like bearding. The processing unit can be configured to measure various characteristics of individual features and their arrangement. For example, the processing unit can measure the length and shape and depth of a bearding feature or inclusion based on pixels. The processing unit can be configured to measure one or more features based on relative distances between features and position, extrapolate the shape of the feature and match with another. Features such as bearding can also be measured in actual size, shape and location values. Gemstone size measurements can be measured by the processor from the imagery or measured using other measurement devices and provided as an input to the processing unit. Exemplary characteristics of one or more of the girdle features that can be measured include, location/coordinates, length, width, shape, color, opacity, type of feature (e.g., bearding), relative position to other features near it, or on an opposite side of the gem to it, if any.

Furthermore, the system 100 can be configured to utilize these and other girdle characteristics as a unique identifier for a gemstone on the one hand and as a security factor on the other. Similarly, the unique combination of girdle features can be used to differentiate between and uniquely identify gems, and to evaluate whether there have been changes to a particular gemstone's features over time.

In addition to capturing the profile of a girdle, natural markings may preexist on a gem and cutting of a gem can also leave man-made or machine made etches in a gem. These features are sometimes only visible under certain lighting conditions, yet these markings define a unique identification fingerprint that is almost impossible to replicate. Accordingly, the processing unit 106 can be configured to record such features and use them for identification of a gem to a very high degree of accuracy and security. In particular, special lighting conditions can be generated by the system 100 using various types of light emitters during the imaging step. Special lighting can include, for example, a simple white light or laser light that is shined at a specific angle onto the gem and that causes these manmade or natural features to stand-out in the girdle images. Alternatively, special lighting can comprise a light pattern or a filtered light source that has a range of wavelengths filtered out or band-passed so as to differ from conventional white light. Additionally, filters can be provided between the light emitter and gemstone or between the gemstone and camera so as to reduce excess glare and screen out blinding light from the camera. Identification of a gemstone based on unique natural and man-made marking features on the girdle can avoid the need for costly equipment previously utilized for identifying a gem using laser inscriptions, which can be easily removed or erased.

The system 100 can be configured to implement the exemplary methods for capturing gemstone features, analysis and characterization using a basic digital image camera such as a smartphone camera. However, more detailed information can be revealed by using a high-definition camera, such as one that has a macro or high-powered zoom. As noted previously, the identifier markings identified through analysis of the gemstone image, among other information extracted or generated from the raw or processed images and diagrams, can be stored in a database, for instance, external storage 112 and/or the storage module 104 shown in FIG. 1.

Preferably the system is configured to obtain images including identifier markings for the entire girdle. As used in this disclosure, the system is or can be configured, in each case, by providing code from a memory which is executed in a processor to perform the functions described herein. Thus, when the system is configured to obtain images including identifier markings for the entire girdle, the processor is configured by code for that purpose.

Identifier markings can also be obtained for all facets of the gem. Additionally, the system can be configured to break up the images into smaller images. For instance images can be broken up based on various features including, for example, at each juncture of the girdle segments, the meeting of facets to the girdle or meeting of facet to facet among other features like inclusions or open surfaces in a gem. The processor can execute code to identify the junctures and divide the images in memory on that basis for analysis or for storage. The raw and processed images, and the generated visual representations of the gemstone, can be stored as a whole 360 degree point to point and line to line diagram. However, even a small juncture or part of a previously stored image of a girdle and/or faceting can be utilized for gemstone identification. For instance, a small juncture of a known/stored gemstone image can be checked against a current query image and, if a match is found, the gem is identified. The system can also be configured to identify a match between gemstones by overlapping girdle images or "marker images," which refers to the point to point and/or line to line diagrams representing the unique combination of features used to differentiate one gem girdle from another.

Further, in accordance with one or more of the embodiments discussed above, if the gem is set in a setting (i.e., "pronged"), an image of the prong and the placement of the prongs and the girdle can also be captured. The system can be configured to use such additional information as an even more specific test to determine whether a gem has moved, been replaced or otherwise altered from its original setting using point to point and line to line comparison and the prongs as a point of identification.

Figure 15:
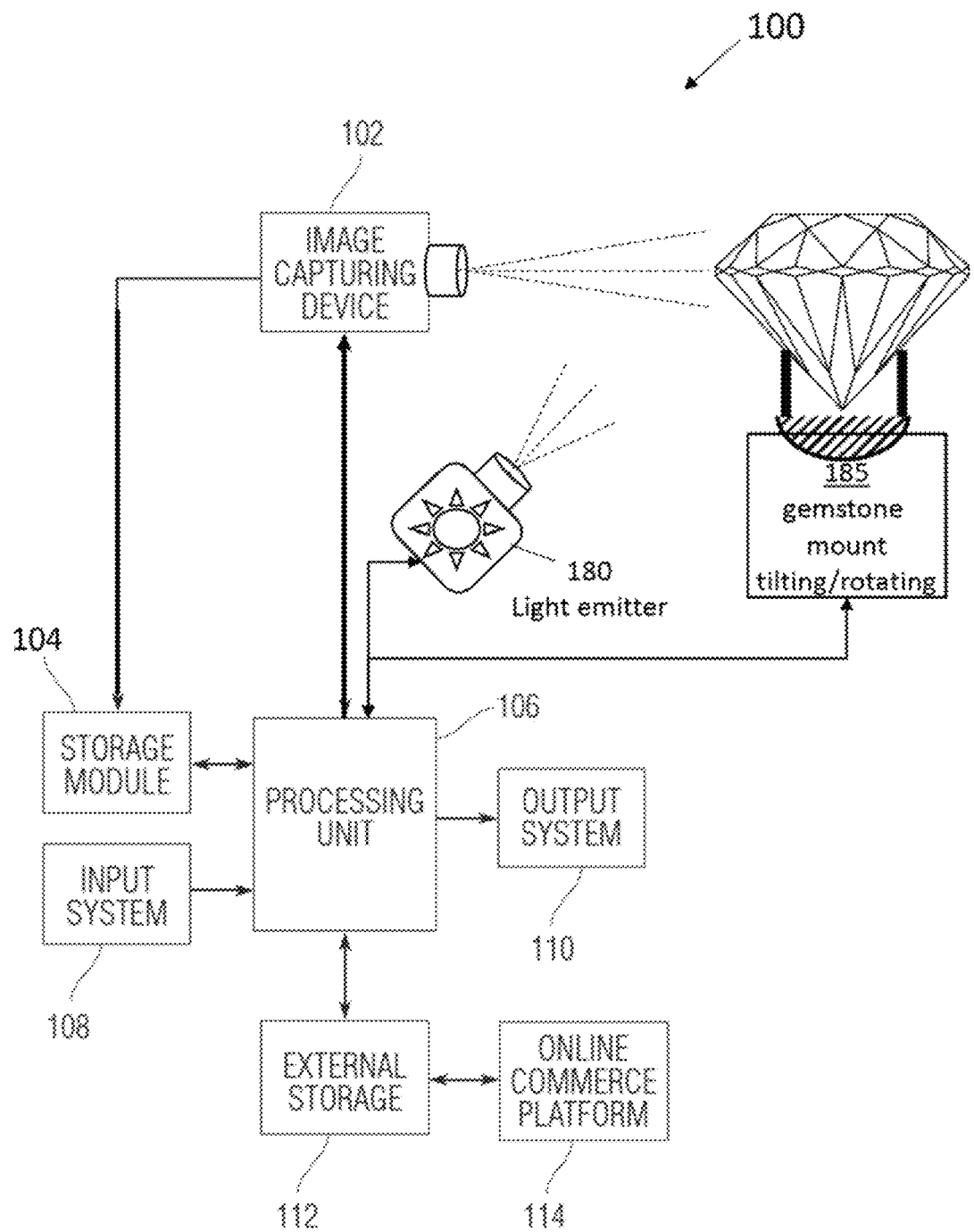
FIG. 15 is a block diagram of the exemplary system shown in FIG. 1 including a light emitter and rotating/tilting gemstone mount in accordance with an embodiment.

In accordance with one or more embodiments, the system 100 can be configured to capture one image or 360 degree video of the gemstone under lighting by a light emitter 180 (as shown in FIG. 15) on and another with it off. The system 100, particularly the processing unit 106, can be further configured to perform a comparison between the lighting on image and lighting off image to further identify any hidden girdle features that present as differences between lit and unlit girdle image. The images can be compared in either parts or the whole, as needed. Additionally, during gemstone identification, a particular portion of a reference image or diagram can be located in a database and compared to the corresponding portion of the query image or line to line or point to point diagram. For example and without limitation, image comparison can be performed using pixel comparison methodologies in which an array of pixels is used for the actual comparison of the query image and the reference image it is being compared to. In addition or alternatively, point to point and line to line diagrams can be generated for respective image segments and compared.

By way of further example, a Neural Network can be trained on the before images of a gemstone to extrapolate pertinent feature data and save it to the database record. The new images of a gemstone are similarly analyzed to gather the feature data and then perform an image comparison against the previously obtained/trained dataset. Matching can be performed incrementally, for instance, if a match of a point-of-interest is found, the processor can be configured to compare more such points from the images.

In one or more embodiments, the processing unit can be configured to implement image comparison as a function of which angle the query images have been taken from and perform matching against recorded images captured from similar angles.

Additionally, the gemstone image comparison can be performed using point to point (P2P) and line to line (L2L) and diagram to diagram (D2D) comparison methods. The P2P L2L and D2D can be used individually or together or in various combinations, depending on what information is of interest and from what angle/s the images were taken.

The collection of feature data points that are usable as a gemstone identifier can be stored in the database record in the form of a diagram that can be physically reproduced for a user to view. In addition, or alternatively, the feature data set can be encoded in the Neural Network or computer program (e.g., in a numerical form, as a mathematical formula or other such machine readable encoded representation). The processing unit can be configured to generate the identifier by executing the steps of: finding and segmenting parts of the jewelry item and tagging them. Then the processor can identify points of interest (POI), key POIs being the gem, girdle, inclusions, facet lines, bearding on girdle or other dents and nicks, culet center and facets leading to it, inscription on gem etc.

As noted, additional identifying and unique features can be found in accordance with one or more of the embodiments. For the jewelry item, for example, the feature data can include the angle of prongs, a location where the prongs touch the gem and the girdle touches the prongs, color of the metal, scratches and other unique features, the stamping on the metal and the like.

In one or more embodiments, the processing unit can be configured to generate the P2P and L2L diagrams in various ways. For instance, if two POI points are found, a descriptor line can be drawn connecting them in multiple ways including: 1) a straight line; 2) a line going through an object within the image; 3) an inverted "V" shaped line or line of some other shape; 4) an imaginary line or real line linked to that descriptor line and having a fixed number of pixels or distance from that connection. Subsequently, such information concerning the POIs can be used to train the matching algorithm to use the same POIs and distances for triangulation and processing of subsequent images. For instance, when a new set of one or more gemstone images (e.g., video, sonar, laser, any sort of image type) for matching against a database record, the processing unit can be configured to identify the same POIs and, using the same pixel distance or line lengths, determine how and where the same points match between both image sets. Since the query image and reference image might not be taken at the same angle and distance relative to the gemstone, the exemplary line to line and point to point and diagram of the POIs (e.g., edges) can provide enough identifier points for the processing unit to match, reject or determine a partial match to a prescribed degree of confidence.

In one or more embodiments, the processing unit can be configured to find POIs on various elements of the jewelry item, align those POIs in a prescribed way by rotating scaling or otherwise adjusting the imagery (and if necessary capture additional images at one or more positions or angles), and measure the POI to POI lines/distances, sizes etc.

As previously noted, in one or more embodiments, the processing unit can be configured to analyze a gemstone image using a reference point or object, such as a object in the foreground or background of the image (e.g., a coin in the image used as a size reference, a circle having a known size provided on the platform of the gemstone mount, a marking on a gemstone holder or imaging station) to obtain bearings, perform accurate alignment, scaling and size measurements.

Figure 14A:
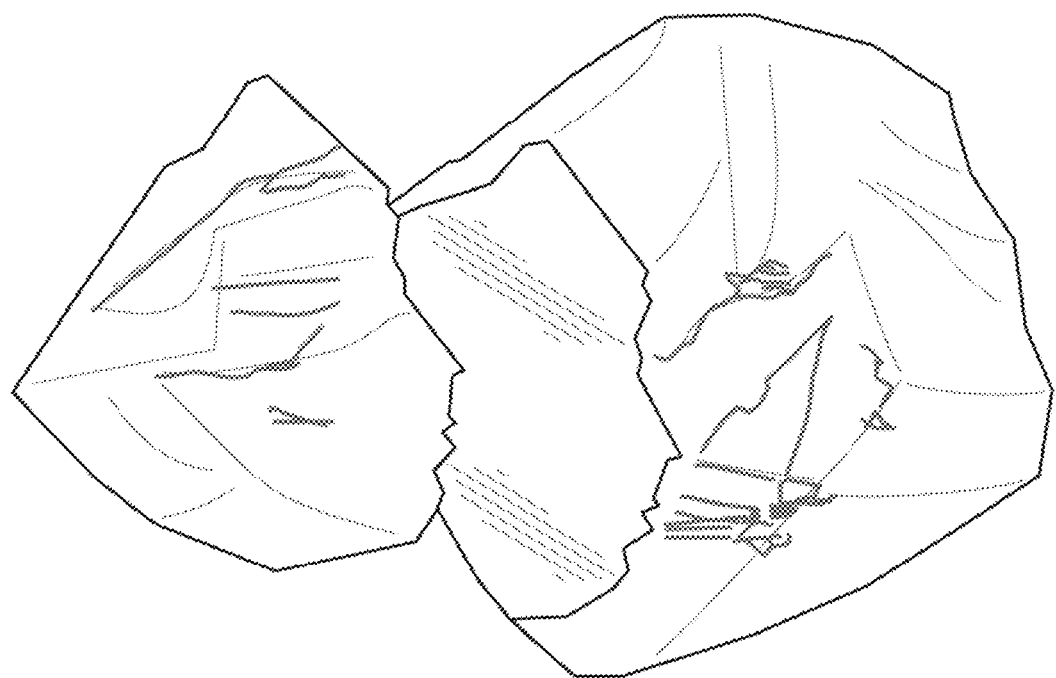
FIG. 14A is an image of a rough diamond captured after being split into two halves in accordance with an embodiment.
Figure 14B:
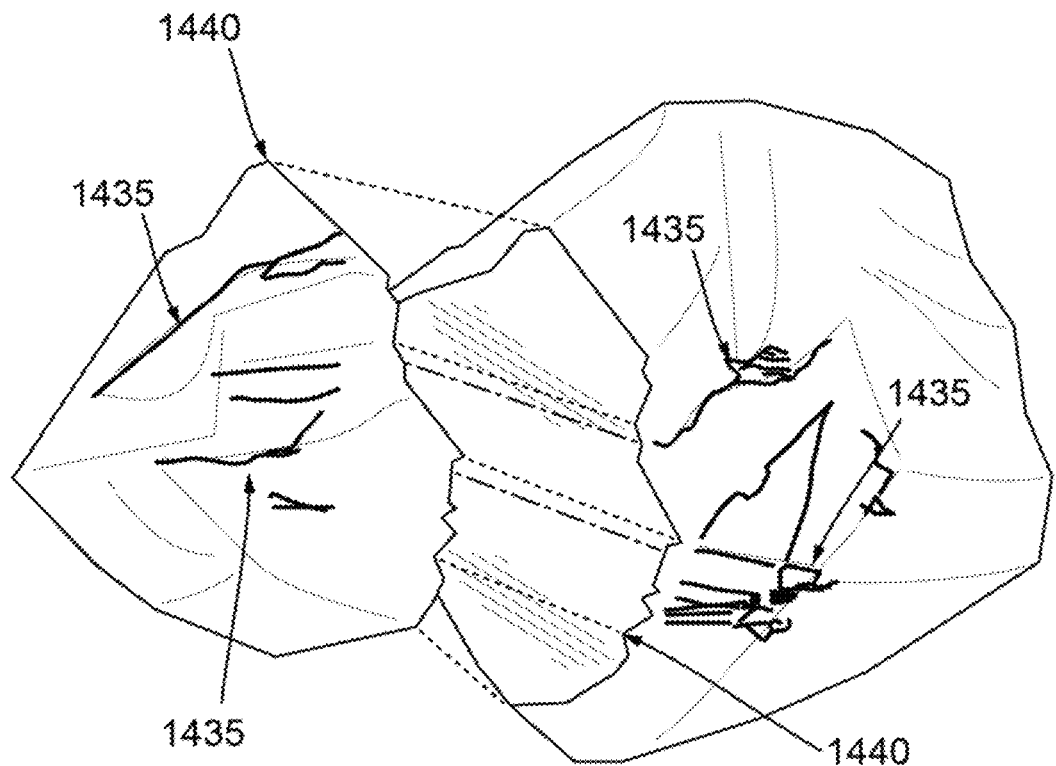
FIG. 14B is a point to point and line to line diagram of detected features of the outer-surface and the edges of two halves of a split stone overlaid on the image of FIG. 14A in accordance with an embodiment.

In accordance with one or more embodiments, other features of a diamond can be imaged and analyzed and used to generate a point to point and line to line diagram at various stages in the manufacturing process. The particular combination of parts of the gemstone that are imaged and analyzed throughout the lifecycle of a gemstone can vary depending on which stage a gemstone is at between discovery at the mine through the retail and ownership stages. For example, FIG. 14A is an image of a rough diamond captured after being split into two portions. FIG. 14B includes a point to point and line to line diagram of detected features of the outer-surface and the edges of the two portions overlaid on the image of FIG. 14A. As shown in the exemplary diagram of FIG. 14B, edges of the diamond are shown as solid bold lines 1435, and dashed lines and dash-dot-dash lines identify the correspondence of certain surface edges/points 1440 on one half of the rough diamond to surface edges/points 1440 on the other half of the rough diamond after splitting.

Additional details concerning exemplary methodologies used by the system 100 for imaging the girdle, identifying unique features, using those features to identify and verify a jewelry item are further described herein.

As noted, the system 100 can be configured to image and analyze features of a gemstone including girdle features using a suitable image capture device 102 having, for example, video, image, and/or laser-based imaging technologies. For instance, the image capturing device can include a digital video camera that has high-resolution imaging capabilities. If, however, a low-resolution image capture device is used, the system, particularly the processing unit 106, can implement image processing algorithms to analyze the image, isolate features and otherwise update the images to more suitable resolution for further analysis.

In one or more embodiments, the image capture device can also be configured to capture images under moving or vibration conditions, such as those conditions that can occur while a gemstone is being cut with a cutting wheel. In such a configuration, the image capture device is preferably able to auto focus to improve imaging quality while the gemstone is moving or vibrating. In one or more configurations of the system, one or more such image capture devices can be used, depending on the type of process being implemented. For instance, different configurations of the system 100 can be provided at the mine stage (e.g., for imaging rough diamonds) or manufacturing stage (e.g., for imaging and analyzing gems during one or more of the cutting, cleaving, polishing, bruiting, rounding and/or polishing the girdle stages etc.). As such, the imaging device needed may vary based on the process being performed at a given stage. However, preferably the imaging device captures imagery that is very focused and high resolution and in view of any required lighting features.

In one or more embodiments, the system 100 can be configured to controllably move the gemstone during imaging, for instance, using a computer-controlled gemstone support table. It can be preferable to image the girdle while it is held at a tilted angle relative to the image capturing device, or while continuously tilting the girdle through a range of angles between a top perspective and bottom perspective angle so that the light bounces off the girdle and minute details of the girdle features including inclusions, cutting patterns, girdle facets, bearding etc. are more visible. Similarly, the system can be configured to make these and other features such as facet lines and natural, cutting or wear and tear created differences and identifier points more visible and brought forth through controlling lighting angle and/or tilting motion and imaging angle.

For example, exemplary steps for imaging the gemstone while rotating and/or tilting the gemstone performed using the system 100 can include: positioning the gemstone at a starting position in which the optical axis is pointed directly at the girdle and perpendicular to the gemstone's vertical axis, which extends from the bottom of the gemstone to the top through the center of the gemstone; controllably rotating the gemstone 360 degrees about its vertical axis between a start/stop location; and capturing imagery continuously during rotation or at a prescribed number of rotational positions. Additionally, at one or more of a plurality of rotational positions, the system can be configured to capture one or more images while a) controllably tilting the gemstone such that the vertical axis is at least partially angled away from the imaging device (e.g., providing a bottom perspective view of the girdle at a given rotational position); b) controllably tilting the gemstone such that is vertical axis is angled at least partially toward the imaging device (e.g., providing a top perspective view of the girdle). Images can also be captured for one or more angles in the range of angles between the tilted-away and tilted toward positions. FIG. 15 is a block diagram of the exemplary system 100 shown in FIG. 1 further illustrating a light emitter 180 and rotating/tilting gemstone mount 185 that are in communication with the processing unit 106 and controllable by the processing unit in accordance with one or more embodiments.

While it can be preferable to automatically control rotation, tilt, imaging angle, and lighting angle automatically by adjusting the position of one or more of the camera, the lighting device and the gemstone mount, more basic configurations of the system 100 can be configured to perform the imaging, girdle-based analysis and identification operations without such computer-controlled enhancements.

Preferably, a gemstone is clean when imaged. However, to avoid dirt or dust being detected as a gemstone feature, the system 100 can be configured to perform imaging and analysis in multiple stages and in relation to a gemstone cleaning stage. For example, in one or more embodiments, an exemplary approach to mitigate detection of false features can include performing an imaging run, followed by a gemstone cleaning stage, which can be either automatically performed by the system or manually. Thereafter, another imaging run can be performed by the system capturing one or more gemstone regions of interest. For instance, imaging can be performed from one or more angles or sides, etc. As a result, the processing unit 106 can be configured to compare the first image run against the second image run and mark out or filter the features or regions that could be dust or dirt as revealed by the comparison. It should be understood that feature filtering to exclude possible false features from dust, dirt or other image artifacts, can be performed by comparing raw or processed images as well as comparing features present in the corresponding marker images generated for the first and second image runs, or done by a neural network that can identify the feature and automatically remove or reject it. The comparison and identification of false features for filtering can be performed, for example, by image subtraction and masking.

In one or more embodiments, the system 100 can comprise a gemstone mount (not shown) for holding the gem. The gemstone mount can be of made of various types of materials, metal, wood, stone, gold, plastic, etc. and might or might not include prongs. An example of a gemstone mount is die, which is typically used to hold a gem as it is cut on a gem cutting wheel and made up of metal and/or some plastic or clay. For example, one or more elements of the system 100 including at least the image capturing device 102 can be provided at a gemstone cutting station that includes a gemstone mount for holding the gem in place during cutting. This same gemstone mount can be used to hold the gemstone during imaging by the system 100. Alternatively, the system 100 can comprise a platform and gemstone mount for supporting the gem during imaging. Additionally, in some configurations, a glue or wax can be used to hold the gem in place on the gemstone mount during imaging.

In one or more embodiments, the gemstone mount can be provided with a code or number or other such identification information marked on it. The gemstone mount ID marks can be detected by the processing unit 106 from imagery and used to ensure that the gem hasn't been removed without authorization. More specifically, similar to the exemplary methods for gemstone and prong setting verification discussed previously, before/after images of a gemstone and the gemstone mount can be analyzed by the processing unit to check if any changes were made to the gemstone mount, or the gem's placement in the gemstone mount, to ensure the gem hasn't been replaced.

As noted, images of a gemstone can be captured at various stages during the mining, manufacturing, marketing/retail and ownership stages. In one or more embodiments, changes made to a girdle during manufacturing (or other gemstone and jewelry item part for that matter), can be captured in a before and after image. Additionally, a before and after image processing method can be implemented by the processing unit 106 which includes at least one processor and a memory to store code to configure the processor, and, hence, the system described herein, to create a new "spliced image" that includes the changed portion(s) of a gemstone part (e.g., girdle, facet, etc.). The "spliced image" can be created using conventional photo or video editing and splicing and gluing operations. The "spliced image" can be created in a virtual way such as building a 3D imaging model of the gemstone part from the before image and then slicing and gluing to that model, a virtual representation of the part that is generated from the after image showing the modified part. Additionally, the processing unit can be configured to implement a combination of these processes to show an image of the changed part on the virtual image or with the virtual spliced part on a real image etc.

As an example before and after image processing method, when a diamond is being cut, it is usually rotated at fixed angles. This rotation can be the trigger for taking an image. As a result, the cutting process can be recorded by the image capturing device. The before image and the image captured after a gem is cut can be checked and, where the changes have occurred can be noted. The new "cut" on the gem can be thus be spliced and recorded into the existing record. This cutting and splicing can be done for a whole gem or just for a touch up of a gem, say to remove some inclusion that is on the surface to improve the gem. The older or (before) untouched part of the gem can be used to confirm that this is indeed the original gem but just the NEW (after) facet (or some change) has been made on same gem. More simply, while work in progress, the unchanged part is used to verify authenticity and the changed part is spliced and recorded and updated with the new sequence in to the database record. As such, the gemstone verification and change recordation methods can be processed simultaneously from the same image/video file as the manufacturing process is being implemented. The same approach can also be used for jewelry items when prongs are being fixed as well.

In one or more embodiments, the image capturing device 102 can be placed in the gemstone processing station (e.g., the cutting or gemstone mount station) or mounted externally, depending on the requirements of the process performed at a given processing station. The system 100 can be configured to automatically start and stop the imaging process in response to a pressure-release, manual, automatic, or some other method of triggering. The image capturing device 102 provides the images to the processing unit 106 and/or stores the images in a database of the system 100 at which point the processing unit 106 can perform the various processes to capture details of the gem (e.g., the weight or where it's from) and identify physical features. In one or more embodiments, the gem or jewelry item can be immersed within a liquid material to enhance the image quality.

Additionally, the processing unit 106 can be configured to create a blockchain-based record using this data etc., which can be updated and enhanced with each subsequent imaging/analysis processes. The block-chain record provides secure ledger for the gemstone and can include any information obtained or generated concerning the gemstone at various points in time. The blockchain holds a sequence of entries/blocks, each comprising gemstone feature data sets captured at a respective point in time (e.g., as newer and newer images are taken by the user). The information recorded in the blocks in the blockchain can include information relating to a gem as well as any metal part of the associated jewelry item, and other information like ownership etc. The resultant changes at every stage are recorded and kept for future reference. The block chain can be created using information obtained in various ways including manually input data (e.g., data entry) or information automatically obtained by optical character recognition analysis of a gem report and other such records. Furthermore the blockchain information can include the data generated from images of human activity of mining, cutting, polishing, and setting the gemstone and the like. The blockchain can also be configured to store all the feature data for the jewelry item including points and lines of interest, preferably, in a format that will allow easy access and search of the data.

In one or more embodiments, the gemstone mount can be in the form of a security box that allows for one to view and image the gem or jewelry item in various ways and to further enhance the security of the gem or jewelry item. In particular, the box can be configured to allow the girdle and the table to be "viewed" either by supporting the item such that it is partially jutting out of the box. Alternatively, the box can be configured to hold the item inside the box and can include one or more holes in the sides and/or top of the box that are sized and shaped to allow an imaging device to be inserted or otherwise allow a camera to image the gemstone in order to run the various security analysis algorithms. The box can further be sealed (e.g., hermetically sealed etc.) and may have its own viewing window with a magnification device attached or given with it. Whereas current sealed boxes are easily tampered with, the exemplary box is configured to allow the system 100 to image and perform security analysis even if the box is tampered with. In one or more embodiments, the gem or jewelry item can be immersed within a liquid material to enhance the image quality.

As noted above, the system 100, particularly the processing unit 106, is configured to identify and measure various features of the gemstone girdle. These features can include, girdle bearding, the wave-like line formed by the top and bottom edges of the girdle, inclusions and other markings. The system is also configured to measure and identify the girdle itself, the lines corresponding to the top and bottom edges of the girdle and the wave-like pattern of peaks and valleys the edges define, and the distance between the two edges. The system is also configured to measure the dimensions and arrangement of girdle segments (e.g., facets), the spacing between girdle segments and the size, spacing and pattern that the junctures (e.g., spaced-apart vertical edges between segments) occur along the girdle length. Detecting edges top/bottom and junctures can be performed using an edge detection image processing methodology. Further the system is configured to identify and measure the small features or and differences created by the cutting process or naturally.

Further the system 100 is configured to create the point to point and line to line diagrams representing these and other girdle features.

The processing unit 106 can be configured to generate a L2L or P2P diagram using a neural network or algorithm programmed to draw lines joining identified points of interest. A line can be a straight line or a bent line, circles or concentric circle lines, or any other prescribed line shape. Lines and points can be represented visually in a diagram. Lines and points can similarly be mathematically represented (e.g., as a formula, values for location and length and direction, a vector, etc.).

The diagram generated for a gemstone is preferably a combination L2L and P2P diagram in which gemstone features are represented by a combination of lines and points. In some instances, a line (e.g., an edge of the girdle or facet or an elongate feature) might not be identifiable or fully identifiable in an image or might be cut off in the image or due to the angle at which the image was captured. Accordingly, points of interest are identified and used in conjunction with the lines to provide a L2L and P2P diagram. However, it should be understood that diagrams of points and lines can be separately provided. The line diagram also can also be used to help isolate whole or parts of the jewelry item or gem.

The processing unit can be configured to generate the L2L and P2P diagram by detecting the various features of a gemstone and representing detected edges of a gemstone and other elongate features as lines and representing smaller point-like features as points. It should be understood that the ends of lines can similarly define points in the diagram. As noted, the L2L and P2P diagram can also include additional lines which the processing unit draws between lines or points-of-interest.

Figure 16:
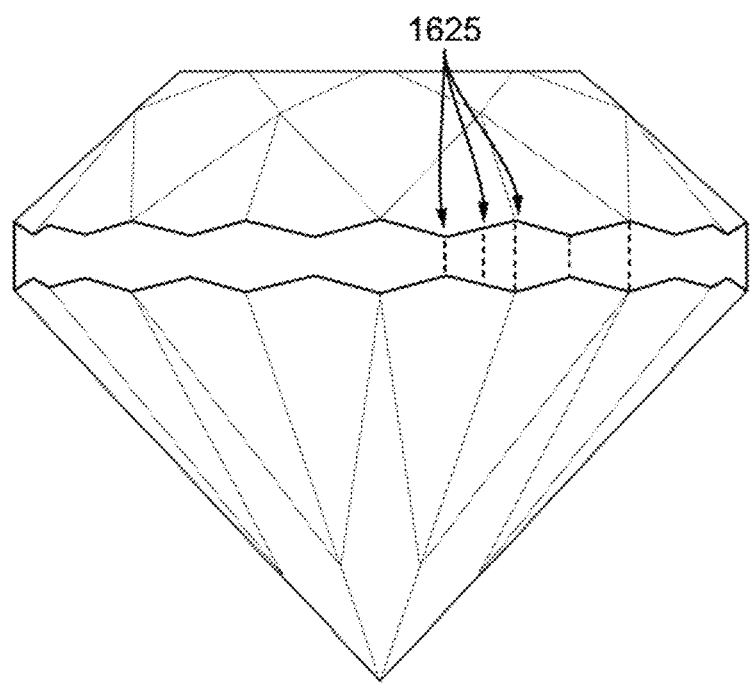
FIG. 16 is a side-view image of a diamond overlaid with an exemplary diagram identifying a pattern of girdle features generated in accordance with one or more embodiments.

In some embodiments, the processing unit can be configured to generate a diagram of a girdle by "drawing" one or more lines along the girdle or parallel to the girdle. In one example, three lines can be drawn, one along the top edge, one along the bottom edge and one in the middle of the girdle. Additionally, the processor can be configured to draw line markers at the location of inclusions, natural or man-made markings on the girdle, girdle bearding and other such features. FIG. 16 is a side-view image of a gemstone overlaid with an exemplary diagram including a sequence of line markers 1625. The diagram of FIG. 16 omits the top/bottom and middle edge lines for simplicity. As shown, the line markers 1625 extend between the top and bottom edge of the girdle in the vertical direction, which is the direction extending between the culet toward the table. The relative position of the girdle feature line markers and the edge/middle lines and the sequence or pattern of those lines provides a high-level "sequence diagram" mapping a gem's unique combination of features. The sequence diagram can be included as part of the P2P and L2L diagram, which includes more granular detail, or separately. The sequence diagram can be usable to compare against other similarly created sequence diagrams to determine a positive match, partial match or non-match.

Additionally, based on the degree to which the sequence diagrams match, more granular P2P/L2L diagram or image-based comparisons can be performed to identify a match. If enough points in a sequence match the processing unit can stop and confirm the match. In response to a partial match of a girdle segment that does not meet a prescribed threshold, the processing unit can be configured to perform a more detailed comparison using L2L and P2P diagrams and/or perform a pixel-based comparison of the underlying gemstone images. For example, if a comparison of a set of line markers 1625 to a reference diagram is not enough to provide a sufficiently high percentage match, the processing unit can be configured to expand the matching by comparing lines and points at or around the set of line markers. By way of further example, the processor can be configured to determine whether the feature points behind a given line marker 1625 are matching to a reference diagram. Additionally, if multiple database records have the same or similar sequence of girdle features, then the processing unit can be configured to perform more granular matching against those database records. Additionally, the processing unit can be configured to perform multiple tests based on multiple parts of an image of a gem and discard the images which a relatively lower sequence matching percentage. The processing unit can be configured to return a percentage match score, additionally, gemstone images or diagrams can be displayed as well.

In one or more embodiments, the processing unit 106 can be configured to encode the sequence or pattern formed by the features identified along one or more segments of a gemstone, for instance, girdle bearding and/or inclusions. For example, the pattern can be generated based on the relative positions of a string of girdle bearding features present on a segment of a gem's girdle extending between a first point and a second point. The pattern can be encoded visually in a diagram, as an alphanumeric or sequence of 1 s and 0s or other suitable encoding scheme. The patterns encoded for one or more segments of a gemstone can thus form a "DNA" sequence for the gemstone. An encoded pattern for a given segment can also be modified over time, for instance, to splice in a new pattern for a segment that has changed.

As noted, the images and/or diagrams can be matched to another set of girdle images, either using image(s) of the whole or a splice, depending on the available viewing area. For instance, if a part of a gemstone is hidden under the prongs in either the current or previously captured gemstone image only part of the image(s) can be used for matching. Additionally, if part of a gemstone is hidden under prongs whereas that part was not hidden during a previous imaging and analysis step, the system can be configured to take the prongs into consideration and, for portions of the gemstone now covered by the prongs, splice in the corresponding portion of the image(s) linked to the original gem image. Accordingly, in the event where the prongs get changed or the gem moves or is moved out of position relative to the prong, the system can be configured to detect that change and alert the user. More specifically, the processing unit 106 can be configured to measure the distances of any of the unique features that are positively found of the gem girdle and also create the points of interest. Those measurements and features can be used to match against another image(s) to confirm a match between image sets and/or, to the extent the images are found to be non-matching, identify any differences between the two. In the event the whole girdle is totally changed like in the bruiting process or girdle polishing process, captured features relating to the gemstone mount can be used as a security measure, among other gemstone parts.

While existing imaging and girdle mapping techniques can be used to tell if the girdle and faceting between two gemstones (or images) is the same or not, this level of scrutiny is insufficient with today's cutting technology that can precisely cut a girdle to replicate a gem. In fact, fraudsters regularly duplicate gems specially and this can make a copied gem unidentifiable if it is a flawless gem. Existing systems are unable to detect when a higher and more valuable colored gem is replaced with a lower color and less valuable gem that has been cut to the same parameters and proportions as the better gem, resulting in significant loss in value. The bearding feature of a girdle, however, can be one of the most powerful differentiating features that cannot be replicated. Accordingly, the exemplary systems and methods disclosed herein are specifically configured to capture, identify and utilize gemstone identifiers that cannot be replicated by even such modern cutting methods, including, girdle bearding. In some embodiments, the girdle and facets can be used to differentiate a lab grown gem from a natural gem based on the way the girdle and facets are cut, the bearding or lack of bearding, and any nicks and dents and faceting lines on the surface, or from internal growth lines. Additionally, the system 100 is configured to track each change to a gem over time and splice the hidden parts/or changes as and when needed and create a digital "fingerprint" or "DNA map" of the features that can be accessed by a user anywhere with cost effective means and technologies.

In accordance with one or more embodiments, the system 100 is configured to use lighting and tilting and other means to capture more information about the physical features of a gemstone than just taking a video or photo. Moreover, the system can comprise various combinations of devices, e.g., tilting, lighting and imaging devices that can be tailored to the type of process being done.

In accordance with one or more embodiments, the exemplary methods for analyzing a gemstone include specific processes for processing the images. These image processing operations can make it easier to match or identify a gemstone even if the image is only a small section of the whole gem like the girdle or even a smaller section (e.g., small section or sections of a girdle). Preferably, one or more visible sections of a girdle may need to be used to increase accuracy, especially if a gem is set in a holder of sorts during the image capture process.

In accordance with one or more embodiments, the processing unit 106, can be configured to implement methods for analyzing a gemstone that include operations for breaking a gemstone down into smaller identifiable parts, and each such part can be searched for in the database. Additionally, the identifying features of the visible segment can be converted into a machine-readable encoded format of say 0's & 1's, alpha numeric codes, and hex codes. As a result, a small segment can have a girdle and an intersecting line. The processing unit 106 can generate and assign a code which can represent information about the gemstone like the coordinates of the segment etc. Additionally, if the girdle has a bearding it can be assigned another prescribed code number. Furthermore, if some inclusion is present, then it can be given another code number, and so on, for the various features that are usable to identify the gemstone. It should be understood that any and all the gemstone information that is stored in the database and that is being searched against the database can be encoded as such. Accordingly, while searching, this encoded information can be used to help narrow the search. Additionally, a line to line and point to point diagram can also be used to perform searching, with or without having these codes embedded in them. As the search progresses, the sequences can be more easily searched or located and matches found.

The one or more diagrams created for a gemstone and/or other parts of a jewelry item can be analyzed individually or collectively or in various combinations to exactly match the pattern. In the event that a girdle has one side matching and not the other, which might happen if over time it has been worn out at some place and not at another or if a gem part or/and gem holder was modified partially, then the processing unit 106 can be configured to deliver a partial-match result.

Additionally, in the situation where the gemstone is known and analysis is being performed for the sake of change monitoring, this can cause the processing unit 106 to splice in the information relevant to the new change. Additionally, in one or more embodiments, a digital record, such as a blockchain entry or "sequence" that includes the information representing the changes, can be created to provide a secure and verified addition to the existing chain for a gemstone and provide proof of the change. This sequence can be shown as a new sequence but linked to the old sequence in possibly a block chain as proof. Thus, either a new item number or old item number can be used to continue identifying the said gemstone. As can be appreciated, the system 100 is configured to analyze and update the digital record in real time as the changes made at various stages of a gem and jewelry items' life. It creates a blockchain based on the imaging and girdle etc. that can be used to follow and identify features and changes throughout the life of the gem.

In accordance with one or more embodiments, the exemplary methods for analyzing a gemstone can further include identifying a metal or a non-metal part that holds the gem or jewelry in place as shown and described above. Accordingly, the processing unit 106 can be configured to use the before and after images to ascertain that the main jewelry item has not been removed from its original holder.

As noted, the processing unit 106 can be configured to generate a diagram of a whole jewelry item, respective parts of a jewelry item (e.g., the gemstone and opposed to the metal part) and/or sub-parts/segments (e.g., a girdle or girdle segment diagram). Accordingly, the processing unit can be configured to segment an image of a jewelry item comprising a gemstone and a metal part (e.g., a ring and prongs that the gemstone is set in) into parts. For instance, the processing unit 106 is configured to segment the image into a gemstone, and metal part, and then segment the metal part into prongs and shank and inclusions and metal scratches etc. Similarly, the portion of the image(s) classified as the gemstone and segmented, can be analyzed to further classify and segment the gemstone image into sub-parts/segments such as the girdle, girdle segments and other gem parts. The processing device thus is configured to, using one or more classifiers and segmentation algorithms, classify the various parts of a gem from the images, separate out the respective parts in the images. The classifiers and segmentation algorithms can assist the training of the neural network used to identify distinguishing features, characterize a gemstone (or other part of the jewelry item) and assist the matching operations performed by the neural network.

In accordance with one or more embodiments, if the full image of a complete gemstone is not available, the processor is configured to perform analysis and matching using a partial image. In particular, the processing unit executing a classification algorithm, can be configured to identify a particular part of the gemstone depicted in the image, say, the girdle or a ¼ girdle segment. Accordingly, the feature data for the girdle can be extracted in accordance with the exemplary methods described herein. Additionally, in accordance with the exemplary methods described herein, the feature data from the query image can be compared matched against one or more references in the database, wherein the feature data is only matched against the corresponding girdle feature data for the respective references.

Because a jewelry item can comprise multiple parts, the processing unit 106 can be configured to generate diagrams for each of the parts and perform matching based on a combination of one or more parts. In accordance with one or more embodiments, the exemplary system 100 can further comprise a reflector device (not shown) attached to the imaging device 102. Accordingly, the processing unit 106 can utilize a reflection of an object or individual off of the jewelry item as a point of distance reference from which the system is configured to calculate distances relative to a jewelry item based on the reflection size and known arrangement of the reflector and imaging device. If any reflectors are used to take photos, then the reflected image can be analyzed by the processor to observe and accumulate data as to size and shape and distance etc. Additionally, the processing unit 106 can be configured to use reflections captured by the image capturing device, such as the light reflections 1120 off the top surface of the prongs shown in FIG. 11B, as points of interest and perform scaling, alignment, measuring and feature triangulation can be performed based on the reflections and the distances therebetween. Other POIs or markers can similarly be used to perform such operations.

Because it can be difficult to focus and because shaking of the gem or holder during imaging can blur the images, in accordance with one or more embodiments, the system 100 can utilize an image stabilizer or other suitable mechanical or software-based stabilization mechanism. Additionally, image stabilization can be inbuilt into the algorithms enabling the use of slightly blurry images. As noted, additional lighting devices can be used to help identify the girdle better and reflect/refract or expose/hide and otherwise enhance the features better than without lighting. Preferably the light is shined by the system on the gemstone part, namely the girdle, at an angle so as to reveal the hidden inclusion or bearding or facets rather than the light source directly hitting the gem and blinding the imaging device. Additionally, the image capturing device 102 can be kept at an angle to the gemstone. Furthermore, the system can be configured to utilize either manual trigger devices or automatic trigger to commence capturing or rotating, tilting and otherwise coordinate the positioning the gem or the various devices of the system 100 to facilitate imaging and analysis.

In accordance with one or more embodiments, the system 100 can be configured to find specific start and stop points of the gem during image capture and ensure that the imaging begins and ends at the start/stop point and thus creates a set of one or more images that depict the complete gemstone girdle without any overlap. This can be difficult for odd shaped objects. Additionally, maintaining the proper focal point can be difficult as the distance keeps changing. Accordingly, the system 100 preferably includes an image capturing device 102 configured to auto focus, or comprises a laser pointer or other ranging systems and methods to ensure precise and consistent focus. Additionally, in one or more embodiments, the system 100 can be configured to capture a top view or identify a reference point on the gem or on the machine by mathematically finding the full circumference based on many things like the facets and their placements and girdle or inclusion pattern etc. In configurations of the system in which a dedicated inspection station is provided, a defined position or point can be used to define a start and stop location.

As can be appreciated, there are various technical challenges to overcome in order to image and analyze a gemstone girdle. For example, it is not easy to find the small differences in the facets without lighting and tilting the gem or the use of a high-powered camera device. Also focusing on the girdle point and finding and splicing and matching or replacing captured images exactly where any changes have occurred or where any part of the gem is hidden.

Additionally, because finding size and distance or depth perception from a 2D image can be challenging, the system 100 can be configured to generate a 3D model from images captured at multiple angles. In addition or alternatively, the system can be configured to gauge depth perception based on a reference to a known object, like a disc or something that reflects off the metal or gem thereby allowing calculations of depth and angles. Accordingly, the system can be configured to automatically identify and analyze the known object's reflections or shadows or degree of refraction and determines the needed information relating to depth and angle.

In accordance with one or more embodiments, the system 100 can have various configurations depending on the application and requisite detail. In one configuration the system can utilize conventional phone cameras and optical magnifying lenses and other instruments like a gem holder or tweezer to tilt and take images. In addition or alternatively, additional light devices and laser pointers could be used as well. Alternatively a box-like mechanical gemstone mount or instrument could be utilized. As noted above, in a more complex arrangement the system can comprise a dedicated imaging station including one or more high-resolution imaging devices, a computer-controlled gem holder, lighting equipment and the like.

The exemplary systems and methods for verification of a gemstone can be utilized to capture and record a unique combination of gemstone features usable to uniquely identify or authenticate a gemstone. The system can be further configured to utilize such information to track changes that take place over time on the jewelry product due to wear and tear, refurbishment and the like.

To recap, the exemplary systems and methods for verification of a gemstone include steps for mapping out the features of a girdle, alone or in combination with other gemstone parts. Using a before and after image recognition technology the system 100 is configured to evaluate if the girdle matches to a prescribed degree of accuracy with a previously taken image of the girdle or even a partial image of part of a girdle that is visible. In this regard, the system 100 is configured to take even the smallest micro parts of the girdle and gem that may or may not be hidden under prongs to find a match. The system is also configured to detect changes as they are made to a gem in real time and updating the database record by splicing in the new feature information and creating a block-chain of such a change.

Additionally, the system can be configured to convert the whole image and gemstone features into an encoded machine-readable format and a diagram model. Encoding features assists in efficiently searching and finding a given gemstone based on encoded features within even huge datasets. Also, even if a part is changed, it can be easily updated in the system and a new sequence can be joined to the old sequence and the associated visualizations stored for display.

Because a large number of features of a gem's girdle are recorded for substantial portions of the girdle, and because matching involves comparing a large number of features to determine whether a threshold matching score is met, even if a small part of the girdle is damaged over time, the gem can still be identified and matched to a pre-existing record using the system 100. Additionally, girdle features in combination with other types of distinguishing features including inclusions and prong setting can be utilized for identifying a gem and jewelry item.

As can be appreciated, the exemplary system 100 identifies distinguishing features of a gem (and optionally the jewelry item it is set in) and encodes those distinguishing features in one or more digital representations of the gemstone that can be stored in a database record for the gemstone. For instance, the digital representation of the gem can be a diagram representing the distinguishing features in the form of point to point and line to line diagram. Additionally, the a (s) can be stored in raw and/or processed form in the database record. Furthermore, information input into the system or derived from the imagery and analysis of the gemstone can be stored to the database record to facilitate subsequent searching, matching and other such operations. That additional information can include, for example, other physical characteristics of the gem or jewelry item, the owner of the gem and the like. By way of further example, the additional information can also include codes representing the characteristics of distinguishing features of the gem, for instance, the aforementioned codes indicating whether the gemstone has features like girdle bearding and a corresponding location.

In accordance with one or more embodiments, the stored database record can subsequently, be used to verify the gem's identity/authenticity by comparing one or more pieces of stored information (e.g., the digital representation) to gem features extracted from images of the gem captured at a later point in time ("query images"). In accordance with one or more embodiments, the system 100 can be configured to update the stored database record to reflect any changes to the gemstone features shown in the later images thereby maintaining an evolving record of the gem and changes thereto over time. This can include splicing into the existing digital representation at least the portions of the more current digital representation of the gemstone that are identified as having changed. In addition or alternatively, the current digital representation can be, in whole or in part, stored into the record without modifying the prior digital representation.

In accordance with one or more embodiments, each entry into or modification of the database record can be accompanied by a blockchain entry. The blockchain entry is created by the system 100 to provide a verified chain and proof of change. Each blockchain entry can also specifically associate the gem at a respective point in time with an owner and the blockchain thus can be used to memorialize changes in the gem as well as the chain of ownership.

As can be appreciated, the system 100 can be further configured to utilize the exemplary systems and methods for identifying and authenticating gemstones to facilitate secure access to access-con lied environment.

In accordance with one or more embodiments, as mentioned above, the system can be configured to create a passcode linking the jewelry item to an owner or user. Furthermore, the system can be utilized as an access control system configured to, based on the authentication or identification of a jewelry item, authorize and provide computer-controlled access to various different types of access-controlled environments. In such a configuration the jewelry item image can be used as a passkey or as a second factor passcode authenticator. More specifically, the system can be in secure communication with a computer-controlled access-controlled environment (ACE). Upon receipt of a request to authorize access the ACE, the system can be configured to capture, and/or otherwise analyze a query image to verify that the jewelry item depicted therein matches a registered item in the database. In one arrangement, the system can be provided with a user name or passcode, as a result the system can be configured to locate the database record associated with the user name or passcode, match the item from the query image against the database record in a one to one fashion, and transmit back confirmation that the jewelry item is verified and associated with the user/passcode. Alternatively, the system can be configured to compare the query image against multiple entries in the database in a one-to-many fashion and, upon a match, output a result. The result can include, for example, and without limitation, an identity of the owner, a passcode associated with the jewelry item and owner, or simply confirmation that the jewelry item is registered with the system. Additionally, it should be understood that the database entry can further include information such as ACE-access permissions enabling the system to verify whether a user is authorized to access a particular ACE. In this regard, the system can be configured to perform gemstone/user identification or authentication on behalf of an ACE computing system that further authorizes and grant/denies access based on the result, or the system can be configured to perform identification/authentication, authorization and control access accordingly. Additionally, the system can be configured to perform identification, authentication and generate various alerts based on the particular needs of the parties.

As can be appreciated from the foregoing, the system can be configured to utilize the identification of a gemstone from its unique combination of features as a replacement or supplement for passwords. In accordance with one or more embodiments, the system can also be configured to utilize the unique combination of features of individual sub-parts of a jewelry item as individual authentication factors as well. Additionally, the system can be configured to authorize a user based on the identification of one or more subparts of a jewelry item. In addition or alternatively the system can be configured to authorize a user or jewelry item based on additional authentication factor. For instance, the system can be configured to authorize by determining whether sub-parts of the jewelry item are presented to the imaging device according to a pre-defined sequence. For example, the system can be configured to allow the user to choose the full face of the jewelry item, or a side view, or any specific part or parts of a jewelry item (e.g., the metal part, or a scratch, or one or more of multiple gems on the item, or any specific part of the item) and possibly zoom in on it when asked for a passcode and verify based on the specific part and/or sequence. By way of further example, the user can be prompted to tap on the screen of the mobile device or keypad or any other input device and, using a single or multiple entry log or keystrokes etc. perform authorization if it matches a prescribed sequence/input. In this regard, the system can be configured to allow the user, during image capture for authorization, point or select the exact area on the captured image feed in single or multiple parts in any or a particular sequence to increase or decrease the level of security. For example, if six prongs hold the gem in place on the jewelry item, the user can tap on the gem and then on prong three and then on prong five in sequence or random (depending on pre-defined user preference). Accordingly, even if the jewelry item is misused by someone, a further level of security is achieved by the system identifying the jewelry item and verifying the supplemental factor is received during image capture (e.g., the an additional passcode that is tapped in by user) as prescribed.

It should be appreciated that other forms of security codes and methods can be used along with the gemstone-based authorization, such fingerprint or iris reading or microchip etc. to enhance security levels. By way of further example, time of day, date, geolocation information captured during gemstone verification, an identification of the device used to capture gemstone images (e.g., a smartphone MAC address) can also be utilized by the system as additional security factors when performing authorization and access-control.

In accordance with one or more embodiments, the system 100 can be configured to operate in connection with a gemstone retail platform to provide for a tag-less jewelry display system in both a brick-and-mortar and virtual marketplace setting. It is a great burden in time and resources to physically tag individual jewelry items that tend to get lost or broken, and to periodically update tags as needed. In accordance with one or more embodiments, the system 100 can be used in connection with the aforementioned online commerce platform to provide a virtual tag for each gemstone thereby enabling a myriad of changes to be easily made to the virtual tag. The database of jewelry items generated using the exemplary system and methods includes a database record for each jewelry item including, physical characteristic details and a blockchain record. With respect to any jewelry items that are for sale, the respective database record can be linked to a corresponding entry in the commerce platform database. Information stored in the commerce platform database can include at least part of the information stored in the system 100 database and additional information such as pricing information, which can be updated manually or automatically in near-real time. It should be understood that the gemstone analysis system database and commerce database can be one and the same.

In accordance with one or more embodiments, the system 100 can be configured to analyze an item and identify similar items in the database using the foregoing jewelry item analysis and comparison methods. Additionally, prices or values associated with similar items in the database can be utilized as a reference for automatically pricing a jewelry item.

In accordance with one or more embodiments, the system 100 can be configured to utilize virtual reality or augmented reality photo/video devices to perform the imaging, analysis and display of information to a wearer or user/controller of the augmented reality device. The image processing and analysis can be performed inside the AR machine itself, using a separate computing device in communication over wifi or Ethernet like a mobile phone. In addition or alternatively, images can be sent to another computing device to perform the image processing and analysis. More specifically, the system can be configured to use an augmented reality device having a camera to capture real time images of jewelry items and make real time calculations and predictions. The augmentation allows the user to move around, either the jewelry item or the image taking device. Based on the real-time analysis of the images, the system 100 can be configured to guide the user, via the AR device display or audio output, where next to move the device or the item and verify whether the movement enabled the system to detect the necessary data. For instance, the user can be instructed to move the imaging device over a gemstone set in a gold set ring being held by 4 prongs (e.g., using audio or visual instructions to capture a top view then side view etc.). As the system receives and identifies the information from the images necessary to identify the item, like the gem top, side, the girdle, prongs, and any small inclusions, scratches or the physical tag that may have a bar code or some sort of identifier, the system can in real time predictively identify the item (e.g., associate it with an existing inventory stock item/number) and predict real-time pricing and other details. The information gathered or generated by the system, such as the line to line and point to point diagrams, prong setting, girdle and other features used to identify or valuate the item can be output to the user, as well as pricing and identification information. This way, the system including the augmented reality input/output interface provided can be used to provide the user with a tag-less ID of the item and virtual price tag. While the foregoing embodiment of the system is configured to work with a dedicated AR device such as AR glasses with imaging and display functionality, a smartphone, tablet or other such mobile computing device can similarly be used with the system to provide an input and output interface with AR functionality.

In accordance with one or more embodiments, the system 100 can be configured to selectively display information to the user. For instance, in some configurations the amount of data displayed to a user about a particular item can be limited or unlimited depending on a user's access level. By way of further example, if the girdle or gem is found and matched then a sequence of processes can be automatically be executed depending on who is using the system and when and what features are available or needed. For instance, upon identification, the system can be configured to show a price tag, and then provide the user with actionable links to a buy or sell function. By way of further example, the system can provide a link to an inventory system to perform a further function or send a code to the user to allow security access to a website.

In accordance with one or more embodiments, the system 100 can be configured to automatically update the value associated with a given item in the database periodically and/or in real-time, thereby updating the "virtual tag" accordingly. For example, as gold price changes, the selling price can be updated in real time. Additionally, the system can be configured to alert one or more users (e.g., owner, interested purchaser, merchant) to see that change, say, via their mobile devices.

In accordance with one or more embodiments, the system 100 can be configured to enable taking of jewelry item stock using augmented reality or virtual reality devices configured to capture images and display information in real-time. For instance, a store owner can capture images of items within a store using an AR-enabled device and the gemstone analysis systems and methods can be used to verify the imaged items against a list of items in inventory to verify the physical presence of all items and notify the user of the inventory status and related information. Further the system can be configured to link the addition or subtraction of a piece of jewelry to any accounting database or inventory management program etc. Additionally, the addition or subtraction of an item from inventory can be linked to a sales or purchase transaction records such that a user can see details of the transaction.

Further if a single jewelry item has multiple pieces being displayed etc., the system can be configured to allow the user to specifically check which of the exact items of that same SKU has been sold. This can assist if the item was made with different qualities of gems or metals etc. and the costing or pricing of an item changes based on those differences. By way of further example, if an item was made by different vendors, the system can be configured to keep a track of which vendor a given item was made by. In this manner, the exemplary system can keep a very specific inventory and can verify with certainty whether a given item is from one supplier or another.

In accordance with one or more embodiments, the system 100 can comprise a reflector device. The reflector can be provided along with the imaging device or can be an exterior surface of the imaging device. For instance, a reflector device could be a mirror finish or a dark black or colored surface of the back of a mobile device that reflects off of a surface of the jewelry item. Because the jewelry item would reflect this off its metal and gems in unique ways, the system can be configured to detect these reflections of the reflector. Then, using these as points to check and match against, the system can better differentiate parts of the jewelry item (e.g., differentiate the gem from the metal and the top of a prong or metal from its sides). Thus, using the reflections, the system can obtain positions and points to take measurements from and build a diagram or point to point or line to line models and perform the checks of the jewelry item.

The point to point and line to line method along with the girdle and plotting the inclusions and other physical properties of a gem and or the jewelry item alone or in combination with the topography of a gem in its raw or uncut form can be used as a starting point to tracking the changes of a gemstone (or jewelry item) starting from its recovery at a mine. In accordance with one or more embodiments, the system can be configured such that, as each step is made in the cutting process, the database record of distinguishing features of the girdle and all older points that are changed can be updated with newer points. An older point is referenced and as that is changed, a new image is taken and replaces the old point.

In accordance with one or more embodiments, if the gem is split into two or more pieces, say using a laser or saw or other device, the system can be configured to match the resultant parts by checking the shape of the cut parts and edges and comparison to the original topography of the gem. The system can be configured to make a 3D match of the parts and the new pieces can be given new identification numbers with an identifier that links these pieces to the original gem and optionally together. Any loss in weight due to cutting processes can also be written into a separate identifier and stored for reference later in the database record.

In accordance with one or more embodiments, the system can include an image capturing device that can take a high-resolution image. In some configurations of the system, the imaging device can be attached to the cutting handle on which a gem is attached while being cut, or it can be separately placed, and can image under high vibration situations. The imaging device is in communication with the processing unit that maintains the gem inventory, performs identification/tracking and implements other system software. As new pieces are polished and set in jewelry items, the gem holders of the jewelry item along with the other identifiers can be used to track the gem.

In accordance with one or more embodiments, the system can be configured to overwrite the encoded identifier of a gem (e.g., the diagram of features) in full or part as needed. Furthermore, the diagram can be configured to show what is changed or not changed as different colors or segments.

In accordance with one or more embodiments, the system can be configured to perform imaging process multiple times and at varying angles for better results. Features such as gemstone weights, colors, place, time of first instance, can be manually or automatically determined by the system using connected devices such as scales or automatic color detection systems. Then a point to point and line to line diagram and 3D models can be created to map the features.

In accordance with one or more embodiments, the system can be configured to generate a code representing girdle features including inclusions or other features between the top/bottom edges of the girdle, segments of the girdle and the like. Using this "code" or alphanumeric or chain of points to identify the one or more segments.

The system can be further configured to match that code to a stored code obtained from another image stored in memory and provide a match result or % deviation. If the entire girdle is mapped, it is possible that some part may have been worn out or obscured due to setting. This would show as a corrupted segment. Accordingly, the system can be configured to determine the maximum number of parts that match.

In accordance with one or more embodiments, after imaging a new surface after cutting or breaking a gemstone into the one or more parts, the system can be further configured to find the new edges and lines. The system can match these lines to find if the parts from the original piece match together with the resulting parts. Any new inclusions or marks or changes in each new piece can be found and a new code or feature diagram can be created for each part. A diagram can identify newly identified parts with markings and any old parts which were partly altered are found and a new part is stitched and added to the cut out old part. The system can also be configured to create a blockchain showing the old and replaced new parts.

In accordance with one or more embodiments, the system can be configured to rotate the gemstone during imaging based on the faceting. Furthermore, each facet can be separately illuminated and the facet junctions can be used as markers to find the junctions and rotate accordingly. The system can be configured to adjust the light to intersect each respective section by increasing or decreased light widths so as to match the size of the respective junction.

These and other aspects of the disclosure can be further appreciated from the following discussion of exemplary practical applications of the systems and methods for security analysis of a jewelry item at multiple points of a gemstone's journey between the mine and marketplace. The timeline begins with an artisanal miner in Africa, finding a diamond in the mines. In accordance with one or more embodiments, he can use his mobile phone to take a photo of the gem he found and, more preferably, a 360 degree view from one or more photos. Using the application on the smartphone providing access to the system 100, he can upload the image to the system for analysis. The miner can use a normal camera photo of the stone captured against a known object for scale so as to enable the system to determine the volume of the stone and use other marks from the natural skin of the gem as identifying marks. Additionally or alternatively, the miner can input the data or put the stone on a weighing scale, check for color, add a marking (using, say, an indelible pen or invisible marking that shows under fluorescent light), add a fingerprint or retina scan to confirm the miner's identity.

For each stone and set of one or more gemstone images, the system 100 can be configured to execute one or more of the image analysis and gemstone identification methods. Information generated including the diagrams of the unique combination of features of one or more parts of the gemstone, raw or processed images, codes and other such information representing the unique features of the gemstone can be stored to the database record.

To secure the record of the gemstone further, the miner can specify a particular security combination code by tapping on the smartphone screen on the photo taken at a specific place or places (combination). For instance, the photo can be broken into say nine (9) boxes (or any number 1~X) or simply the miner enters the code by touching the image at specific points. The app interface of the system can enable the miner to magnify the image, rotate etc. to find the points and codify. The time, place, location can also be stamped of this find in the imagery and stored information and codification is registered. A further time stamp can be keyed in and recorded to allow the gem to only be verified at a future, specific date, time and place or location, for example where the miner gets paid when further cleaning or testing of the gem and reweighing may take place at some other location. The application can be configured to enable the miner to release the passcode based on the diagram of the image when he gets paid. Any unfulfilled payments can be received at a later date through the application as well as any subsequent tips for the miner, say, a tip from an end consumer that has access to the block chain link between miner/raw stone to the polished gem or jewelry item and decides to tip the miner at that time. Any necessary bank details etc. can be linked to this in a blockchain.

By way of further example, if the miner is a large conglomerate, they can simply do a mass scale analysis by passing the gems through a series of HD cameras, x-ray, infra-red or ultraviolet imaging systems and the like. The scanned and codified rough can be placed into boxes or parcels and shipped out to the manufacturers. Each rough now having its own digital identity in a respective database record. The codes maybe given only when the rough gems reach the place of destination. Example the manufacturers office in India. Until then, the code is not passed on or used and kept secret. There can be a master-code for a large package containing thousands of rough gems each having unique digital identity. The package itself can have a "seal" that can be photographed and that "seal" being intact until the destination is re photographed and verified as authentic and undamaged or unopened. The "seal" can be simple or complicated. Either a signature or stamp or maybe covered by a tape or barcode etc. anything that gets damaged if tampered or opened. Any set of further security measures can be used for verification.

Once the parcel is verified then opened and security codes transferred, the gems inside can be photographed and any computer file or details about them either passed on or simply taken piece by piece and entered into the system 100 just before giving out stones for cutting and polishing or re-sale. This way, all through the mining to the manufacturing process, the rough can be verified and a certificate of authenticity can be passed on throughout the chain. Any rough not having a digital recorded image and signature can be considered a diamond from illegitimate sources.

At the manufacturing stage, a gem can be either sawn, cut or broken, polished into smaller piece(s) and these piece(s) recorded through imaging, analysis and data entry using the system 100. Each new piece thus has a link to the original rough. Any weight loss while breaking or sawing of the original rough, can be recorded using the system. Now, as each process takes place, a rough will have new edges that will identify them better. Here these edges and girdles will have unique features. These edges can be matched by the system to the original rough halves or pieces. For instance, as shown in FIG. 14B, edges of one half of a stone are associated with corresponding edges of the second half of a stone. The edges, thus are new markers for a gemstone. The old markers being the original gem skin and any contours and holes or dirt or color/discoloration in the rough among other features.

Because of loss reduction, where diamonds get switched especially at the cutting stage, or loose rough or polished stages, even if 7% of gems are prevented from being switched using the exemplary systems disclosed herein, this can equal to a 2-3% increase in profitability for a manufacturer.

Additionally, in one or more embodiments, the plan for processing a rough gem (e.g., the particular plan for cutting, polishing etc. a rough into a finished gem) can be input into the system and saved to memory. The system can thus be configured to compare the gemstone information recorded at one or more stages in the manufacturing process to the details of the plan to verify whether the gem is being manufactured according to the plan.

Further when a gem is being cut, sawn, polished, bruted etc., either it is being rotated manually or automatically by machines and pressed against a cutting wheel or sawing or passed through a laser machine. Through all these processes, the gem must be held by a gemstone mount of some sort or other. It could be clay, metal or non-metal etc. each having its own identifiable features. Accordingly, the system can be configured to capture a before and after image and the gemstone mount (e.g., prongs) are verified. As the gem is rotated and the edges and table and sides are polished, images of the gem holder can similarly be taken and analyzed by the system 100 at one or more points along the process. Image capture can be initiated manually by hand or foot operated switches or wearing a camera over the head or google pixel glasses or any such devices. More than one image capturing device can be used to be able to take the before and after images at the same time in unison so that there is no opportunity to make any changes to the item while taking the images.

The system can be configured to process the image and verify that the before and after images are matching. The gemstone mount should match if the gem has been re-cut. The older/untouched/uncut area of the gem can be used as verifier and the re-cut part seen as new part. That new re-cut part can be added to the prior image record (e.g., cut and splice the image or using other image manipulation techniques) to create a new block of data in the chain. Both the gem holder (e.g., gem holder identifier or prong setting) and the un-changed gem parts can be used as verification markers in accordance with one or more embodiments. Ultimately, as the new finished gem is created, the system updates the database record having the full block chain to date. The system can further use the girdle and any bearding on it as further markers. The system might include a high magnification image capturing device 102, like a microscope, and light devices that help bring out the fine features better. The passcode feature can be used at anytime and at any stage or in-between stages of manufacturing and the new fully processed or semi-processed gem image can be uploaded and codified.

As the rough is polished and then set in the jewelry item in a gem holder or is kept in a parcel loose or with other gems, the system 100 can be used to identify them based on the unique features of the gemstone facets, inclusions, prong settings among other features. According to a further embodiment, the system can be used to identify the gem using the girdle of the gemstone. The girdle is one of the most unique features of a gem because it cannot be replicated like any other feature, particularly, the bearding on a girdle left by the polishing or other processes. Furthermore, abrasion marks and the tiny feathers or inclusions, along with the physical features of the girdle and gem itself, leave an incredibly unique trail and can be utilized to perform gemstone identification in accordance with one or more embodiments. The system can preferably be configured to take images of gemstones before setting in a gem holder (e.g., prongs of a ring and the like) and after it is set. Sometimes the facet/girdle can be damaged or broken etc. when the jewelry item is being polished, or the gem is being set. Accordingly, the system can be configured to perform verification that allows for a prescribed amount of acceptable difference in such features in the gem and/or other elements of the jewelry item as it changes hands and is getting finished and made ready. In one or more embodiments, the girdle can have a laser inscription which can be verified with before and after images and also by where it is located on the girdle and the verification to the last pixel that the system can be used to further identify the gem. However, even without an inscription, which can be polished away or replicated, the system can be configured to identify a gemstone based on girdle features including: the bearding, the valley and peak or wave like pattern of edges, vertical edges on the girdle and the distance between them that make the girdle (depending on the shape and cut type of a gem—e.g. round cut or princess cut or pear shape, among a long list of others—each having their own specific cutting styles, methods and shapes etc.). Whereas gemstone features like facets can be replicated, the bearding alone or in combination with other features created either naturally or through cutting and polishing processes leave a non-replicable combination of features usable by the system for verification.

In accordance with one or more embodiments, the system implements methods for quickly identifying even a small part of a gem that can searched and found in the database. In particular, the gem and associated jewelry images can be broken into parts. The girdle can similarly be divided into parts. Accordingly, the system can be configured to perform a partial search if parts are hidden or missing from an image being searched. Furthermore, any parts changed in some process or due to aging of the item can be updated or taken into consideration. Any old and new features can be identified and said to be part of the original and updated into the database so as to reflect the change. The loose gem and or gem set jewelry item or just any jewelry item can be verified in accordance with the various gem and jewelry item verification and security analysis methods alone or in combination with the girdle-based identification methods.

In accordance with one or more embodiments, the jewelry item image can be used by itself or converted into a diagram of features that are usable as an identifier and that can be used to provide a virtual retail tag for a jewelry item, thereby avoiding the necessity for physical tags on jewelry items. Accordingly, upon identification of an imaged jewelry item, the system can be configured to show stored information about the item to a user on a display screen. The information provided virtually to a user can include a sequence of videos like a story of the item or who to contact for repairs or the person the item was bought from and their name, location and contact information, or pop up ads when the virtual tag is viewed at certain locations. The virtual tag can also be customized, for example, gift messages can be an input by a purchaser into their mobile device such that the recipient of the jewelry item as a gift can use the system to access the virtual tag and receive the message (e.g., as a pop up or spoken message).

Further, the jewelry diagram can be associated with a passcode and the system can be configured to use the diagram of features generated from the item image to verify the item and, based on the verification perform some operation such as open websites or run machine code driven functions in a program. Similarly, the system can be utilized in connection with a payment system at a store, for example. In such a configuration the system can be configured to take an image of the jewelry item and run a verification. If the item in the image is verified, a push notification can be sent to the mobile device of the owner, with an image and they can enter a password or passkey, tap the image at a random or preset sequence, or touch on the screen (e.g., a prong or part of prong) in accordance with a pre-set passcode. Further this can be further secured by verifying according to additional pre-set authentication factors including, for instance, a preset time and location for use of the jewelry item as a universal pass code or key for transactions.

Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the disclosed methods to be carried out. It should be noted that in other embodiments, the order of the operations can be varied, and that some of the operations can be omitted. The electronics can also include a user interface equipped with a touch screen (e.g., a touch screen of the image capturing and gem evaluation device, such as a touch screen of a mobile phone) to permit computer interaction.

It should be understood that various combination, alternatives and modifications of the disclosure could be devised by those skilled in the art. The disclosure is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for analysis of physical characteristics of a gemstone, the method comprising:
   receiving, by a computing device having a non-transitory computer-readable storage medium and a processor configured by executing a software program stored in the storage medium, from an image capturing device over an electronic communication connection, a first set of images of the gemstone, wherein the first set of images depict at least a girdle of the gemstone;
   processing, by the processor of the computing device, the first images to extract physical characteristics of at least the girdle, wherein the step of processing the first set of images comprises:
      identifying, by the processor from the first set of images, physical characteristics of the girdle from the images, wherein the step of identifying the physical characteristics of the girdle from the first set of images includes:
         detecting a top and bottom edge of the girdle and junctures defining segments of the girdle using an edge detection image processing methodology, wherein the segments are surfaces of the girdle extending between the top and bottom edges, and
         detecting the physical characteristics of the segments and the edges of the girdle, the physical characteristics including girdle bearding, imperfections, and inclusions,
      generating, by the processor, a diagram of at least the girdle, wherein the diagram is one or more of a point-to-point diagram and a line diagram and depicts the physical characteristics of the girdle, and
      measuring, by the processor of the computing device using one or more of the first set of images and the generated diagram of the girdle, values of the detected physical characteristics of the girdle; and
   storing, by the processor of the computing device in a database record for the gemstone, current gemstone information for the gemstone that includes at least the generated diagram of the girdle and information representing the measured physical characteristics.

2. The method of claim 1, wherein the step of processing the first set of images further comprises: stitching together a plurality of images in the first set to create a combined image of the gemstone including at least the girdle.

3. The method of claim 1, wherein the step of identifying the physical characteristics of the girdle from the first set of images comprises:
   detecting and measuring a value for the physical characteristics including at least one of:
   a wave-like pattern defined by a plurality of valleys and peaks formed by the top or bottom edge of the girdle,
   a change in distance between the top and bottom edges of the girdle about a circumference of the girdle,
   a respective location of a plurality of junctures defining girdle segments, and a pattern defined by the plurality of girdle junctures.

4. The method of claim 1, wherein the values of the physical characteristics of the girdle are measurements representing at least a plurality of:
   a location of girdle bearding on the girdle,
   a location of man-made or natural imperfections on the girdle,
   a location of natural inclusions on the girdle,
   a girdle faceting, and
   a girdle structure.

5. The method of claim 4, further comprising:
   generating an encoded representation of the girdle using the measured values of the physical characteristics of the girdle.

6. The method of claim 1, further comprising:
   generating, a time-stamped block in a block-chain, wherein the block includes one or more of the measured values of the physical characteristics of the girdle, identification data for the gemstone, the first set of images and the diagram, and wherein the block-chain is stored in the database record for the gemstone.

7. The method of claim 1, further comprising:
   capturing the first set of images using an image capturing device connected to the processor, wherein the first set of images comprises one or more of a still image, a video and a laser-based topography model of the gemstone.

8. The method of claim 6, further comprising:
   capturing, using the image capturing device, the first set of images wherein the first set of images are captured from a plurality of different angles relative to the girdle of the gemstone, and
   illuminating, using a light source, the girdle at one or more prescribed angles while capturing at least one of the one or more images in the first set of images.

9. The method of claim 8, wherein the capturing step further comprises:
   tilting the gemstone relative to the image capturing device to capture the images at the plurality of different angles.

10. The method of claim 1, further comprising:
    matching, by the computing device, at least a portion of the current gemstone information to prior gemstone information from a preexisting gemstone record in the database, wherein the preexisting gemstone record is either associated with the gemstone or is associated with another gemstone.

11. The method of claim 10, wherein the step of matching current gemstone information to prior gemstone information comprises:
one or more of:
comparing the diagram for the gemstone to a previously recorded diagram in the preexisting gemstone record, and
comparing the measured values of the physical characteristics of the gemstone to previously stored measured values of physical characteristics in the preexisting gemstone record; and
calculating a difference between the current gemstone information and prior gemstone information based on the comparison.

12. The method of claim 11, wherein the gemstone information and the prior gemstone information are for the same gemstone, and further comprising:
in the event when the calculated difference exceeds a threshold difference,
generating, by the computing device, an alert, and
updating the preexisting database record to include at least a portion of the gemstone information representing the difference between the current gemstone information and prior gemstone information based on the comparison.

13. The method of claim 10, wherein the step of matching current gemstone information to prior gemstone information comprises:
superimposing the diagram generated from the first set of images over a previously recorded diagram in the preexisting gemstone record, and
calculating, from the superimposed diagrams using a pixel-to-pixel comparison methodology, a difference between the current gemstone information and prior gemstone information.

14. A system for analysis of physical characteristics of a gemstone, the system comprising:
an image capturing device for capturing a first set of images of gemstone, and wherein the first set of images comprises one or more images that depict at least a girdle of the gemstone from at least a side view;
a database;
a computing device operatively connected to the image capturing device and the database, the computing device having a non-transitory computer-readable storage medium and a processor, wherein the processor is configured by executing a software application to process the first set of images using an image processing algorithm to extract physical characteristics of at least the girdle by:
identifying, from the first set of images, the physical characteristics of the girdle from the images, wherein identifying the physical characteristics of the girdle from the first set of images includes:
detecting a top and bottom edge of the girdle and junctures defining segments of the girdle using an edge detection image processing methodology, wherein the segments are surfaces of the girdle extending between the top and bottom edges, and
detecting the physical characteristics on segments and edges of the girdle, the physical characteristics including girdle bearding, man-made imperfections, and inclusions,
generating a diagram of at least the girdle, wherein the diagram is one or more of a point-to-point diagram and a line diagram and depicts the physical characteristics of the girdle,
measuring, using one or more of the first set of images and the generated diagram of the girdle, values of the extracted physical characteristics of the girdle, and
wherein the processor is further configured to store, in a database record for the gemstone, current gemstone information for the gemstone that includes at least the first set of images, the generated diagram of the girdle and information representing the measured, extracted physical characteristics; and
a display operatively connected to the processor and configured to visually output the current gemstone information.

15. The system of claim 14, wherein the processor is further configured to identify the physical characteristics of the girdle from the first set of images by:
detecting and measuring the physical characteristics of the girdle including at least one of:
a wave-like pattern defined by a plurality of valleys and peaks formed by the top or bottom edge of the girdle,
a change in distance between the top and bottom edges of the girdle about a circumference of the girdle,
a respective location of a plurality of junctures defining girdle segments, and a pattern defined by the plurality of girdle junctures.

16. The system of claim 15, wherein the values of the physical characteristics of the girdle are measurements representing at least a plurality of:
a location of girdle bearding on the girdle,
a location of imperfections on the girdle,
a location of natural inclusions on the girdle,
a girdle faceting, and
a girdle structure.

17. The system of claim 14, wherein the processor is further configured to generate an encoded representation of the girdle using the measured values of the physical characteristics of the girdle.

18. The system of claim 14, wherein the processor is further configured to generate a time-stamped block in a block-chain, wherein the block includes one or more of the measured values of the physical characteristics of the girdle, identification data for the gemstone, the first set of images and the diagram, and wherein the block-chain is stored in the database record for the gemstone.

19. The system of claim 14, wherein the first set of images comprises one or more of a still image, a video and a laser-based topography model of the gemstone.

20. The system of claim 14, further comprising:
a light source configured to illuminate the girdle while capturing the first set of images; and wherein the image capturing device is configured to capture the first set of images from a plurality of different angles relative to the girdle of the gemstone, and wherein the light source is configured to illuminate the girdle at one or more prescribed angles.

21. The system of claim 20, further comprising:
a gemstone mount configured to hold the gemstone and controllably rotate and tilt the gemstone relative to the image capturing device thereby enabling the image capturing device to capture the images at the plurality of different angles.

22. The system of claim 14, wherein the processor is further configured to:
compare at least a portion of the current gemstone information to prior gemstone information from a preexisting gemstone record in the database, wherein the preexisting gemstone record is either associated with the gemstone or is associated with another gemstone.

23. The system of claim 14, wherein the processor is further configured to:
  calculating a difference between the current gemstone information and prior gemstone information based on the comparison.

\* \* \* \* \*